(12) United States Patent
Chen et al.

(10) Patent No.: US 11,009,382 B2
(45) Date of Patent: May 18, 2021

(54) LIQUID LEVEL SENSING

(71) Applicant: HEWLETT-PACKARD DEVELOPMENT COMPANY, L.P., Houston, TX (US)

(72) Inventors: Chien-Hua Chen, Corvallis, OR (US); Michael W. Cumbie, Corvallis, OR (US); Robert N. K. Browning, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 152 days.

(21) Appl. No.: 16/092,531

(22) PCT Filed: Jul. 21, 2016

(86) PCT No.: PCT/US2016/043290
§ 371 (c)(1),
(2) Date: Oct. 10, 2018

(87) PCT Pub. No.: WO2018/017095
PCT Pub. Date: Jan. 25, 2018

(65) Prior Publication Data
US 2019/0162576 A1  May 30, 2019

(51) Int. Cl.
*G01F 23/24* (2006.01)
*B41J 2/175* (2006.01)

(52) U.S. Cl.
CPC ........ *G01F 23/247* (2013.01); *B41J 2/17566* (2013.01); *G01F 23/246* (2013.01)

(58) Field of Classification Search
CPC ...... G01F 23/22; G01F 23/247; G01F 23/246; G01N 35/04; B41J 2/17566; B41J 2/17513

USPC .......................................................... 73/295
See application file for complete search history.

(56) References Cited

U.S. PATENT DOCUMENTS

| | | | |
|---|---|---|---|
| 3,745,828 A | 7/1973 | Howell | |
| 4,129,848 A | 12/1978 | Frank et al. | |
| 5,205,172 A * | 4/1993 | Doak | G01F 23/04 33/731 |
| 5,406,315 A | 4/1995 | Allen et al. | |
| 5,721,573 A | 2/1998 | Benjamin | |
| 6,007,173 A | 12/1999 | Delouise et al. | |

(Continued)

FOREIGN PATENT DOCUMENTS

| | | |
|---|---|---|
| CN | 87209272 | 6/1988 |
| CN | 201993380 U | 9/2011 |

(Continued)

OTHER PUBLICATIONS

Kisic, et al; "Flexible Inkjet Printed Sensor for Liquid Level Monitoring"; Electronics Technology (ISSE); May 6-10, 2015; 38th International Spring Seminar.

*Primary Examiner* — Octavia Hollington
(74) *Attorney, Agent, or Firm* — Fabian VanCott

(57) ABSTRACT

In one example a liquid level sensor is described. The sensor includes a carrier and a liquid level sensing interface disposed on the carrier. The liquid level sensing interface includes a number of liquid level sensing devices disposed on an elongated strip. The number of liquid level sensing devices detect a liquid level in a liquid container. The liquid level sensing interface also includes a number of thermal isolation components formed on the elongated strip to thermally isolate adjacent liquid level sensing devices.

20 Claims, 17 Drawing Sheets

(56) References Cited

U.S. PATENT DOCUMENTS

| | | |
|---|---|---|
| 6,578,942 B1 | 6/2003 | Tuhro et al. |
| 6,994,426 B2 | 2/2006 | Silberbrook |
| 7,748,268 B2 * | 7/2010 | Lull ........................ G01F 1/684 73/204.22 |
| 7,814,788 B2 * | 10/2010 | Halaka .................. G01F 23/268 73/304 C |
| 8,065,913 B2 | 11/2011 | McCracken et al. |
| 9,810,566 B2 * | 11/2017 | Eshchenko ........... G01F 23/247 |
| 10,107,667 B2 * | 10/2018 | Cumbie ................... B41J 2/195 |
| 10,739,181 B2 * | 8/2020 | Cumbie ............... B41J 2/17566 |
| 2005/0120791 A1 | 6/2005 | Carlson et al. |
| 2005/0126282 A1 | 6/2005 | Maatuk |
| 2014/0260520 A1 | 9/2014 | Schoenberg |

FOREIGN PATENT DOCUMENTS

| | | |
|---|---|---|
| CN | 204924372 | 12/2015 |
| EP | 2995913 A1 | 3/2016 |

* cited by examiner

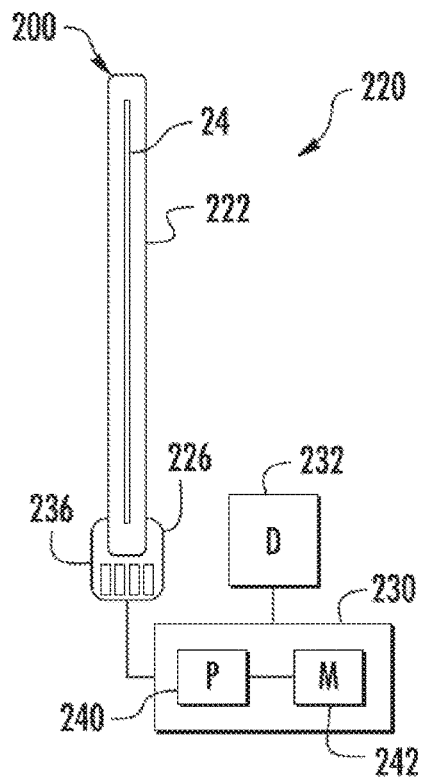
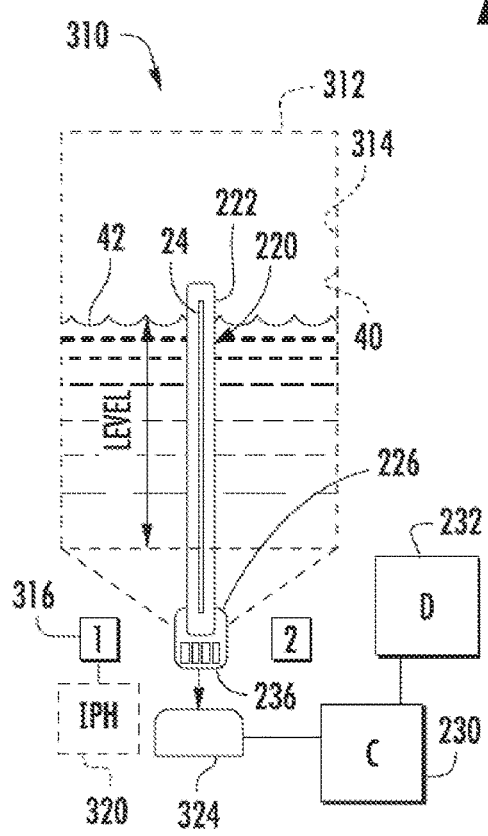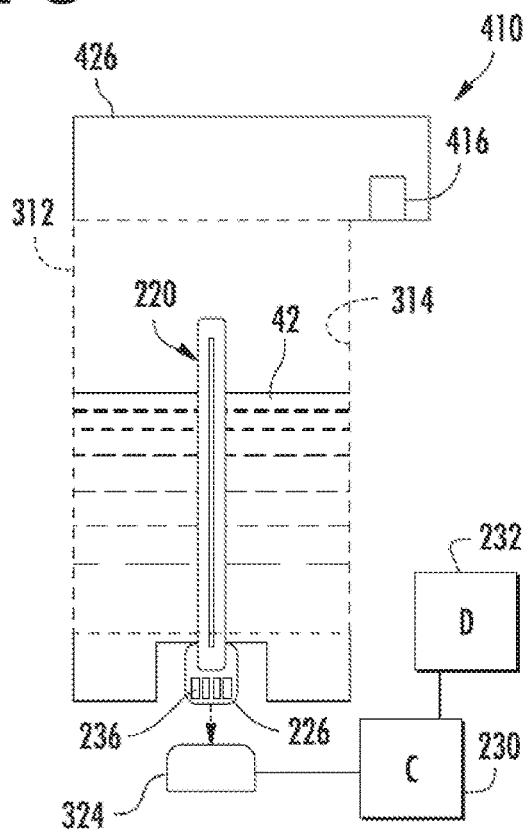

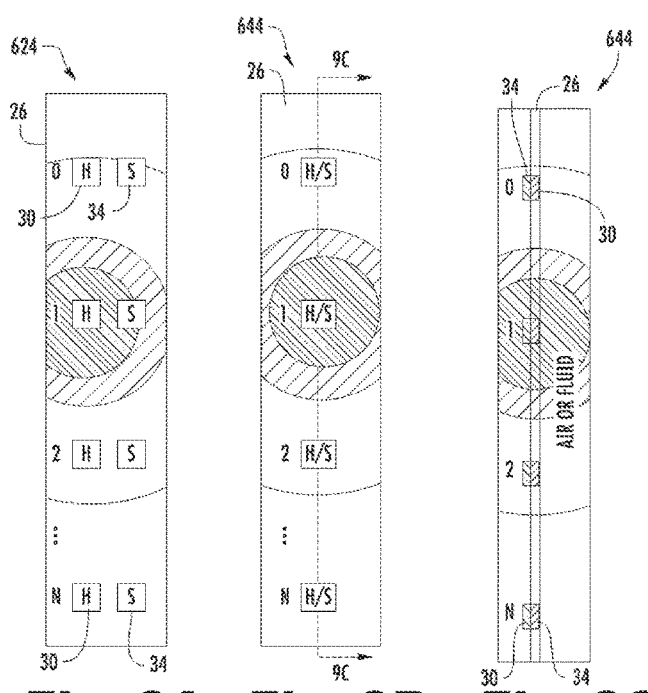
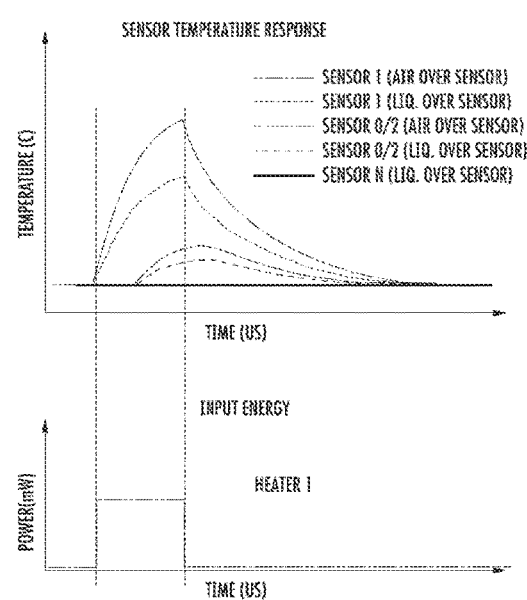
Fig. 9A  Fig. 9B  Fig. 9C  Fig. 10

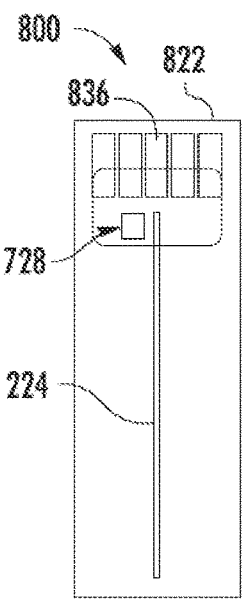
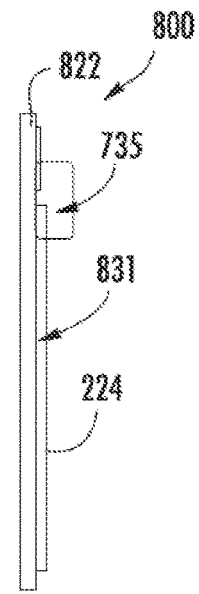
*Fig. 14*  *Fig. 15*
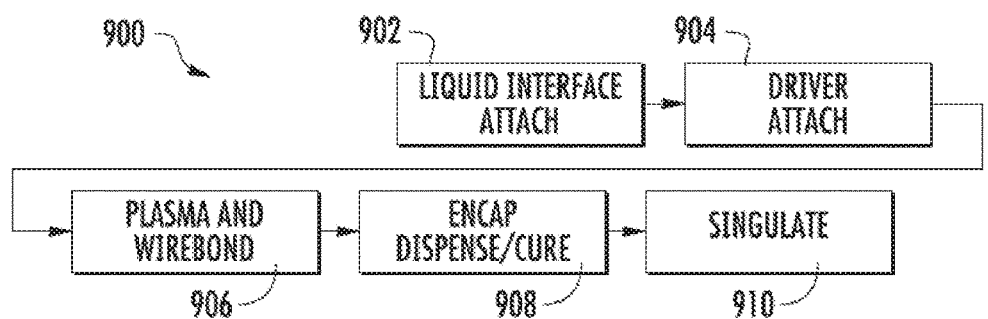
*Fig. 16*
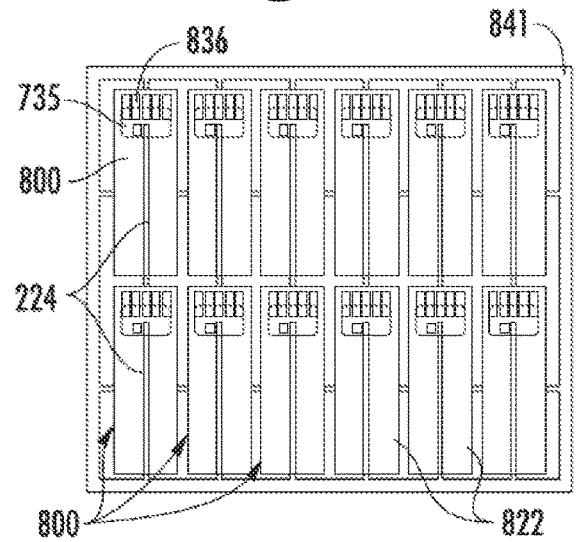
*Fig. 17*

LIQUID LEVEL SENSING

BACKGROUND

Liquid containers are used to contain various types of liquids. For example in printing systems, print cartridges hold stores of printing liquid such as ink. The ink, or other printing liquid from a reservoir, is supplied to a printhead which deposits the printing liquid onto a print medium, such as paper. As the printing liquid is deposited onto a print medium, the printing liquid is depleted from the liquid reservoir.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 3 is a diagram of a liquid level sensing system, according to one example of the principles described herein.

FIG. 4 is a diagram of a liquid supply system including the liquid level sensing system of FIG. 3, according to one example of the principles described herein.

FIG. 5 is a diagram of a liquid supply system including the liquid level sensing system of FIG. 3, according to another example of the principles described herein.

FIG. 9A is a fragmentary front view of the liquid level sensor of FIG. 6, illustrating an example heat spike resulting from the pulsing of a heater, according to one example of the principles described herein.

FIG. 9B is a fragmentary front view of another liquid level sensor, illustrating an example heat spike resulting from the pulsing of a heater, according to one example of the principles described herein.

FIG. 9C is a sectional view of the liquid level sensor of FIG. 9B, illustrating the example heat spike resulting from the pulsing of the heater, according to one example of the principles described herein.

FIG. 10 is a graph illustrating different sensed temperature responses over time to a heater impulse, according to one example of the principles described herein.

FIG. 14 is a front view of a liquid level sensor, according to one example of the principles described herein.

FIG. 15 is a side view of the liquid level sensor of FIG. 14, according to one example of the principles described herein.

FIG. 16 is a flow diagram of a method for forming a liquid level sensor, according to one example of the principles described herein.

FIG. 17 is a front view of a panel upon which multiple liquid level sensors have been formed, prior to singulation, according to one example of the principles described herein.

Throughout the drawings, identical reference numbers designate similar, but not necessarily identical, elements.

DETAILED DESCRIPTION

Figure 1A:
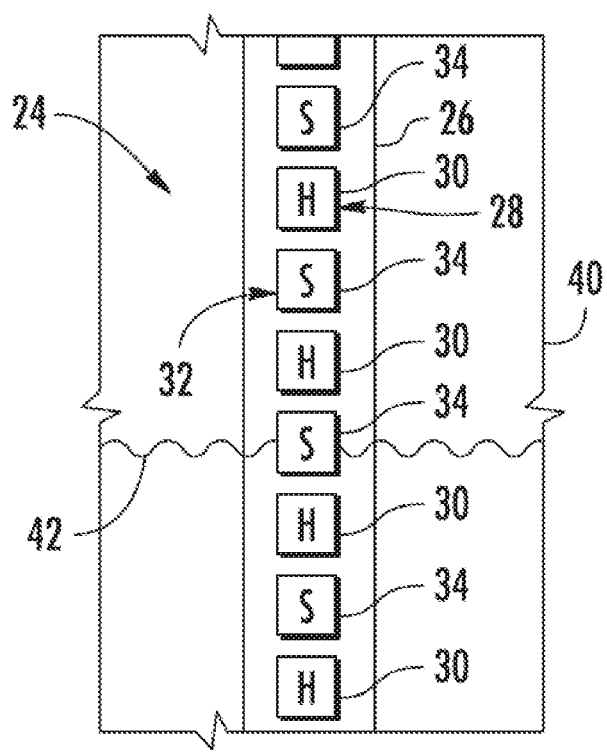
FIG. 1A is a diagram of a portion of a liquid level sensing interface, according to one example of the principles described herein.

Liquid containers are used to hold various types of liquids. For example, in a printing system, an ink cartridge stores a volume of ink. This ink is passed to a printhead for deposition on a medium to form text or images on the print medium.

As printing liquid is deposited on a medium, the liquid container is depleted of printing liquid. Attempting to execute a printing operation when a liquid container is empty can result in damage to the printing device, the printhead, or the container itself. Moreover, print quality can suffer if printing is executed with a reduced amount of liquid in the container. Still further, it may be inconvenient to a consumer if a liquid container runs out of liquid and the consumer has not been able to adequately prepare, for example by purchasing additional liquid containers. Such consumer inconvenience can lead to customer dissatisfaction and loss of profits by a manufacturer of the container.

Accordingly, liquid level sensors can be used to detect the amount of liquid in a liquid container. Such sensors indicate a level of liquid in the liquid container in an attempt to provide helpful, accurate information regarding liquid levels, and in the case of a printing system, can be used to estimate how much printing can be performed given the present level of ink in an ink reservoir.

While such liquid level sensors can be helpful in indicating an amount of liquid, some characteristics reduce the sensors ability to accurately indicate a liquid level. For example, certain sensors enable only low-resolution analog liquid level sensing and support less efficient liquid level sensing methods. Moreover, many devices that are currently used to sense the level of a liquid within a volume may be relatively complex and expensive to manufacture. For example, some liquid level sensing devices utilize expensive componentry and expensive materials and also involve dedicated complex manufacturing processes.

The present specification describes various examples of liquid level sensors that are less expensive to manufacture. As will be described hereafter, in some examples, the disclosed liquid level sensor facilitates the use of materials having a wide range of temperature coefficient of resistance. In some examples, the disclosed liquid level sensors can sense the level of otherwise corrosive liquids without using generally more expensive corrosive resistant materials. Specifically, the liquid level sensors of the present specification implement a narrow liquid level sensing interface, less than 220 micrometers wide. Disposed on the narrow liquid level sensing interface are liquid level sensing devices that detect a liquid level.

Specifically, the present specification describes a liquid level sensor. The liquid level sensor includes a carrier. A liquid level sensing interface is disposed on the carrier. The liquid level sensing interface includes a number of liquid level sensing devices disposed on an elongated strip. The number of liquid level sensing devices detect a liquid level in a liquid container. The liquid level sensor also includes a number of thermal isolation components disposed on the elongated strip to thermally isolate adjacent liquid level sensing devices.

The present specification also describes a method for forming a liquid level sensor. In the method, a liquid level sensing interface comprising an elongated strip having a number of liquid level sensing devices disposed thereon is coupled to a carrier. The number of liquid level sensing devices are thermally isolated from one another and a driver is coupled to the carrier. The driver outputs data collected from the number of liquid level sensing devices. The number of liquid level sensing devices are electrically coupled to the driver via the liquid level sensing interface.

In another example, a printable liquid container is described. The printable liquid container includes a chamber to hold a volume of the printable liquid. A liquid level sensor is disposed within the chamber. The liquid level sensor includes a carrier to provide electrical connectivity between a number of liquid level sensing devices and electrical interconnects and to provide mechanical protection of a liquid level sensing interface on which the number of liquid level sensing devices are disposed. The liquid level sensor also includes a liquid level sensing interface disposed on the carrier. The liquid level sensing interface includes a number of liquid level sensing devices disposed on an elongated strip. The number of liquid level sensing devices detect a liquid level in a liquid container. A number of thermal isolation components of the liquid level sensor are disposed on the elongated strip and thermally isolate adjacent liquid level sensing devices.

Using such a sensor for sensing a liquid level 1) provides a low cost, high volume, and simple manufacturing process; 2) isolates adjacent liquid level sensing devices to reduce thermal cross-talk between adjacent pairs and thereby increasing liquid level sensing sensitivity; 3) provides a high resolution and high performance liquid level sensing platform; 4) supports multiple processes for detecting liquid levels; and 5) results in increased customer satisfaction due to the increased performance. However, it is contemplated that the devices disclosed herein may address other matters and deficiencies in a number of technical areas.

As used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

FIG. 1A illustrates an example liquid level sensing interface (24) for a liquid level sensor. Liquid level sensing interface (24) interacts with liquid (42) within a volume (40) and outputs signals that indicate the current level of liquid (42) within the volume (40). Such signals are processed to determine the level of liquid (42) within the volume (40). Liquid level sensing interface (24) facilitates the detection of the level of liquid (42) within the volume (40) in a low-cost manner.

As schematically shown by FIG. 1, liquid level sensing interface (24) comprises a strip (26), a series (28) of heaters (30) and a series (32) of sensors (34). The strip (26) includes an elongated strip that is to be extended into volume (40) containing the liquid (42). The strip (26) supports the heaters (30) and the sensors (34) such that a subset of the heaters (30) and sensors (34) are submersed within the liquid (42), when the liquid (42) is present.

In one example, the strip (26) is supported (from the top or from the bottom) such that those portions of the strip (26), and their supported heaters (30) and sensors (34), when submersed within a liquid (42), are completely surrounded on all sides by the liquid (42). In another example, the strip (26) is supported along a side of the volume (40) such that a face of the strip (26) adjacent the side of the volume (40) is not opposed by the liquid (42). In one example, the strip (26) has an elongated rectangular, substantially flat cross-section. In another example, the strip (26) has a different polygon cross-section or a circular or oval cross-section.

The heaters (30) are individual heating elements spaced along a length of the strip (26). Each of the heaters (30) is sufficiently close to a sensor (34) such that the heat emitted by the individual heater may be sensed by the associated sensor (34). In one example, each heater (30) is independently actuatable to emit heat independent of other heaters (30). In one example, each heater (30) is an electrical resistor. In one example, each heater (30) is to emit a heat pulse for duration of at least 10 μs with a power of at least 10 mW.

In the example illustrated, heaters (30) are employed to emit heat and do not serve as temperature sensors. As a result, each of the heaters (30) may be constructed from a wide variety of electrically resistive materials having a wide range of temperature coefficients of resistance. A resistor may be characterized by its temperature coefficient of resistance, or TCR. The TCR is the resistor's change in resistance as a function of the ambient temperature. TCR may be expressed in ppm/° C., which stands for parts per million per degrees Celsius. The temperature coefficient of resistance is calculated as follows: temperature coefficient of a resistor: TCR=(R2−R1)e−6/R1*(T2−T1), where TCR is in ppm/° C., R1 is in Ohms at room temperature, R2 is resistance at operating temperature in Ohms, T1 is the room temperature in ° C. and T2 is the operating temperature in ° C.

Because the heaters (30) are separate and distinct from temperature sensors (34), a wide variety of thin-film material choices are available in wafer fabrication processes for forming the heaters (30). In one example, each of the heaters (30) has a relatively high heat dissipation per area; high temperature stability (TOR<1000 ppm/° C.), and an intimate coupling of heat generation to the surrounding medium and heat sensor. Suitable materials can be refractory metals and their respective alloys such as tantalum, and its alloys, and tungsten; and its alloys, to name a few; however, other heat dissipation devices like doped silicon or polysilicon may also be used.

Sensors (34) may be individual sensing elements spaced along the length of the strip (26). Each of the sensors (34) is sufficiently close to a corresponding heater (30) such that the sensor (34) may detect or respond to the transfer of heat from the associated or corresponding heater (30). Each of the sensors (34) outputs a signal which indicates or reflects the amount of heat transmitted to the particular sensor (34) following and corresponding to a pulse of heat from the associated heater (30). The amount of heat transmitted to the associated sensor (34) will vary depending upon the medium through which the heat was transmitted prior to reaching the sensor (34) and upon the amount of heat absorbed by either the liquid or air that is adjacent to the sensor (34). For example, liquid has higher heat capacity than air so it will decrease the temperature detected by sensor (34). As a result, the differences between signals from the sensors (34) indicates the level of the liquid (42) within the volume (40).

In one example, each of the sensors (34) is a diode which has a characteristic temperature response. For example, in one example, each of the sensors (34) comprises a P-N junction diode. In other examples, other diodes may be employed or other temperature sensors may be employed.

In the example illustrated, the heaters (30) and sensors (34) are supported by the strip (26) so as to be interdigitated or interleaved amongst one another along the length of the strip (26). For purposes of this disclosure, the term "support" or "supported by with respect to heaters (30) and/or sensors (34) and a strip (26) indicates that the heaters (30) and/or sensors (34) are carried by the strip (26) such that the strip (26), heaters 20, and sensors (34) form a single connected unit. Such heaters (30) and sensors (34) may be supported on the outside or within and interior of the strip (26). For purposes of this disclosure, the term "interdigitated" or "interleaved" indicates that two items alternate with respect to one another. For example, interdigitated heaters (30) and sensors (34) may comprise a first heater, followed by a first sensor, followed by a second heater, followed by a second sensor and so on.

In one example, an individual heater (30) may emit pulses of heat that are to be sensed by multiple sensors (34) proximate to the individual heater (30). In one example, each sensor (34) is spaced no greater than 20 μm from an individual heater (30). In one example, sensors (34) have a minimum one-dimensional density along the strip (26) of at least 80 sensors (34) per inch (at least 40 sensors (34) per centimeter). In some examples, there may be at least 100 sensors (34) per inch along the strip (26). The one dimensional density includes a number of sensors (34) per unit measure in a direction along the length of the strip (26), the dimension of the strip (26) extending to different depths, defining the depth or liquid level sensing resolution of the liquid level sensing interface (24). In other examples, sensors (34) have other one dimensional densities along the strip (26). For example, in another example, the sensors (34) have a one-dimensional density along the strip (26) of at least 10 sensors per inch. In other examples, sensors (34) may have a one-dimensional density along the strip (26) on the order of 1000 sensors per inch (400 sensors per centimeter) or greater.

Figure 1B:
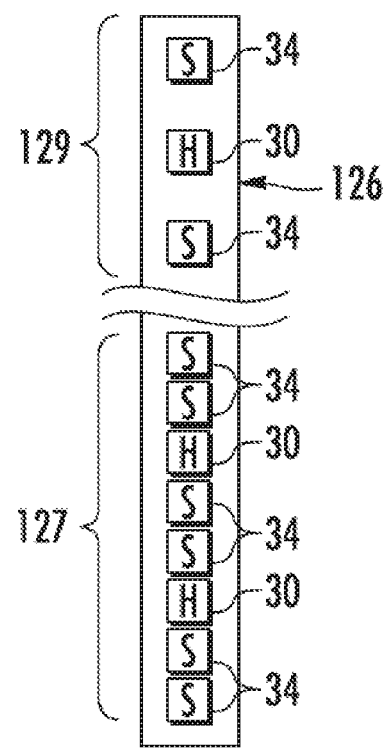
FIG. 1B is a diagram of portions of a liquid level sensing interface, according to one example of the principles described herein.

In some examples, the vertical density or number of sensors (34) per unit length may vary along the vertical or longitudinal axis of the strip (26). FIG. 1B illustrates an example sensor strip (126) having a varying density of sensors (34) along its major dimension i.e., its length. In the example illustrated, the sensor strip (126) has greater density of sensors (34) in those regions along the vertical height or depth that may benefit from a greater degree of depth resolution. In the example illustrated, the sensor strip (126) has a lower portion (27) having a first density of sensors (34) and an upper portion (129) having a second density of sensors (34), the second density being less than the first density. In such an example, the sensor strip (126) provides a higher degree of accuracy or resolution as the level of the liquid (42) within the volume (40) approaches an empty state. In one example, the lower portion (127) has a density of at least 40 sensors (34) per centimeter while the upper portion (129) has a density of less than 10 sensors per centimeter, and in one example, four sensors (34) per centimeter. In yet other examples, an upper portion or a middle portion of the sensor strip (126) may alternatively have a greater density of sensors as compared to other portions of the sensor strip (126).

Each of the heaters (30) and each of the sensors (34) are selectively actuatable under the control of a controller. In one example, the controller is part of or carried by the strip (26). In another example, the controller comprises a remote controller electrically connected to the heaters (30) on the strip (26). In one example, the liquid level sensing interface (24) is a separate component from the controller, facilitating replacement of the liquid level sensing interface (24) or facilitating the control of multiple liquid level sensing interfaces (24) by a separate controller.

Figure 2:
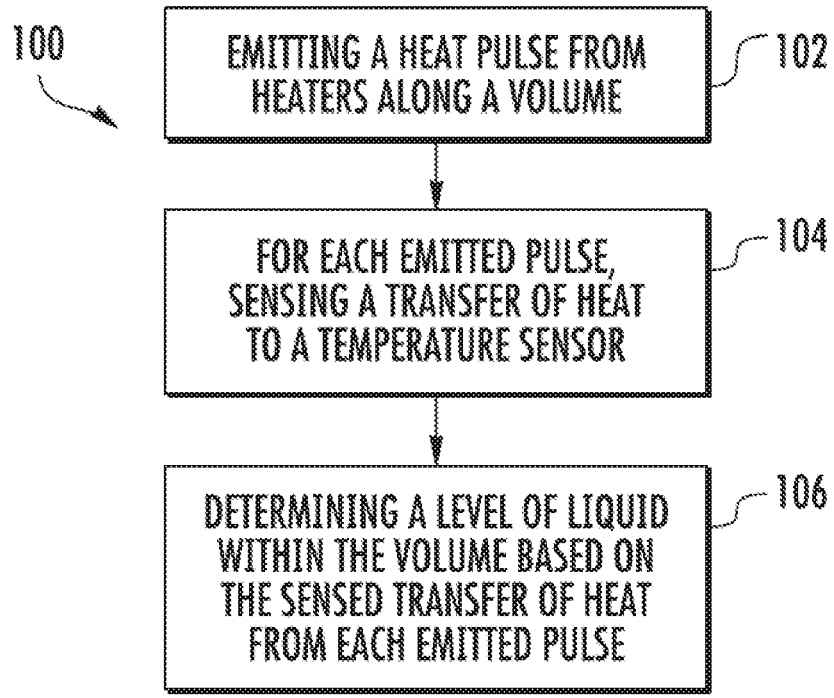
FIG. 2 is a flow diagram of a method for determining a level of liquid, according to one example of the principles described herein.

FIG. 2 is a flow diagram of a method (100) that may be carried out using a liquid level sensing interface, such as liquid level sensing interface (24), to sense and determine the level of a liquid (42) within a volume (40). As indicated by block 102, control signals are sent to the heaters (30) causing a subset of heaters (30) or each of the heaters (30) to turn on and off so as to emit a heat pulse. In one example, control signals are sent to the heaters (30) such that the heaters (30) are sequentially actuated or turned on and off (pulsed) to sequentially emit pulses of heat. In one example, the heaters (30) are sequentially turned on and off in order, for example, in order from top to bottom along the strip (26) or from bottom to top along the strip (26).

In another example, the heaters (30) are actuated based upon a search operation, wherein the controller identifies which of the heaters (30) should be initially pulsed in an effort to reduce the total time or the total number of heaters (30) that are pulsed to determine the level of the liquid (42) within the volume (40). In one example, the identification of what heaters (30) are initially pulsed is based upon historical data. For example, the controller consults a memory device to obtain data regarding the last sensed level of the liquid (42) within the volume (40) and pulses those heaters (30) most proximate to the last sensed level of liquid (42) before pulsing other heaters (30) more distant from the last sensed level of liquid (42).

In another example, the controller predicts the current level of the liquid (42) within the volume (40) based upon the obtained last sensed level of liquid (42) and pulses those heaters (30) proximate to the predicted current level of liquid (42) within the volume (40) and not pulsing other heaters (30) more distant from the predicted current level of liquid (42). In one example, the predicted current level of liquid (42) is based upon the last sensed level of the liquid (42) and a lapse of time since the last sensing of the level of the liquid (42). In another example, the predicted current level of the liquid (42) is based upon the last sensed level of the liquid (42) and data indicating the consumption or withdrawal of liquid (42) from the volume (40). For example, in circumstances where the liquid level sensing interface (24) is sensing the volume of an ink in an ink supply, the predicted current level of liquid (42) may be based upon last sensed level of liquid (42) and data such as the number of pages printed using the ink or the like.

In yet another example, the heaters (30) may be sequentially pulsed, wherein heaters (30) proximate to a center of the depth range of volume (40) are initially pulsed and wherein the other heaters (30) are pulsed in the order based upon their distance from the center of the depth range of the volume (40). In yet another example, subsets of the heaters (30) are concurrently pulsed. For example, a first heater and a second heater may be concurrently pulsed where the first heater and the second heater are sufficiently spaced from one another along the strip (26) such that the heat emitted by the first heater is not transmitted or does not reach the sensor (34) intended to sense transmission of heat from the second heater. Concurrently pulsing heaters (30) may reduce the total time for determining the level of liquid (42) within the volume (40).

In one example, each heat pulse has a duration at least 10 μs and has a power of at least 10 mW. In one example, each heat pulse has a duration of between 1 and 100 μs and up to a millisecond. In one example, each heat pulse has a power of at least 10 mW and up to and including 10 W.

As indicated by block 104 in FIG. 2, for each emitted pulse, an associated sensor (34) senses the transfer of heat from the associated heater (30) to the associated sensor (34). In one example, each sensor (34) is actuated, turned on or polled following a predetermined period of time after the pulse of heat from the associated heater (30). The period of time may be based upon the beginning of the pulse, the end of the pulse or some other time value related to the timing of the pulse. In one example, each sensor (34) senses heat transmitted from the associated heater (30) beginning at least 10 μs following the end of the heat pulse from the associated heater (30). In one example, each sensor (34) senses heat transmitted from the associated heater (30) beginning 1000 μs following the end of the heat pulse from the associated heater (30). In another example, the sensor (34) initiates the sensing of heat after the end of the heat pulse from the associated heater (30) following a period of time equal to a duration of the heat pulse, wherein such sensing occurs for a period of time of between two to three times the duration of the heat pulse. In yet other examples, the time delay between the heat pulse and the sensing of heat by the associated sensor (34) may have other values.

As indicated by block 106 in FIG. 2, the controller or another controller determines a level of the liquid (42) within the volume (40) based upon the sensed transfer of heat from each emitted pulse. For example, liquid has higher heat capacity than air so it will decrease the temperature detected by sensor (34). If the level of liquid (42) within the volume (40) is such that liquid (42) is adjacent to a particular heater (30) and its associated sensor (34), heat transfer from the particular heater 32 to the associated sensor (34) will be less as compared to circumstances where air is adjacent to the particular heater (30) and its associated sensor (34). Based upon the change in temperature sensed by the associated sensor (34) following the emission of the heat pulse by the associated heater (30), the controller determines whether air or liquid is adjacent to the particular heater (30) and the associated sensor (34). Using this determination and the known location of the heater (30) and/or sensor (34) along the strip (26) and the relative positioning of the strip (26) with respect to the floor of the volume (40), the controller determines the level of liquid (42) within the volume (40). Based upon the determined level of liquid (42) within the volume (40) and the characteristics of the volume (40), the controller is further able to determine the actual volume or amount of liquid remaining within the volume (40).

In one example, the controller determines the level of liquid (42) within the volume (40) by consulting a lookup table stored in a memory, wherein the lookup table associates different signals from the sensors (34) with different levels of liquid (42) within the volume (40). In yet another example, the controller determines the level of liquid (42) within the volume (40) by utilizing signals from the sensors (34) as input.

In some examples, the method (100) and liquid level sensing interface (24) may be used to not only determine an uppermost level or top surface of liquid within the volume (40), but also determine different levels of different liquids concurrently residing in the volume (40). For example, due to different densities or other properties, different liquids may layer upon one another while concurrently residing in a single volume (40). Each of such different liquids may have a different heat transfer characteristic. In such an application, the method 100 and liquid level sensing interface (24) may be used to identify where the layer of a first liquid ends within the volume (40) and where the layer of a second different liquid, underlying or overlying the first liquid, begins.

In one example, the determined level (or levels) of liquid within the volume (40) and/or the determined volume or amount of liquid within the volume (40) is output through a display or audible device. In yet other examples, the determined level of liquid (42) or the volume of liquid is used as a basis for triggering an alert, warning, or the like to a user. In some examples, the determined level of liquid (42) or volume of liquid is used to trigger the automatic reordering of replenishment liquid or the closing of a valve to stop the inflow of liquid into the volume (40). For example, in printers, the determined level of liquid (42) within the volume (40) may automatically trigger reordering of the replacement ink cartridge or replacement ink supply.

FIG. 3 is a diagram of a liquid level sensing system (220), according to one example of the principles described herein. The liquid level sensing system (220) includes a carrier (222), a liquid level sensing interface (24), an electrical interconnect (226), a controller (230) and a display (232). The carrier (222) has a structure that supports the strip (26). In one example, the carrier (222) is a strip formed from, or that includes, a polymer, glass or other material. In one example, the carrier (222) has embedded electrical traces or conductors. For example, the carrier (222) may include composite material having woven fiberglass cloth with an epoxy resin binder. In one example, the carrier (222) is a glass-reinforced epoxy laminate sheet, tube, rod or printed circuit board.

The liquid level sensing interface (24), described above, extends along a length of the carrier (222). In one example, the liquid level sensing interface (24) is glued, bonded or otherwise affixed to the carrier (222).

The electrical interconnect (226) is an interface by which signals from the sensors (34) (shown in FIG. 1) of the liquid level sensing interface (24) are transmitted to the controller (230). In one example, the electrical interconnect (226) has electrical contact pads (236). In other examples, the electrical interconnect (226) may have other forms. The electrical interconnect (226), carrier (222) and interface (24), collectively, form a liquid level sensor (200) that may be incorporated into and fixed as part of a liquid container volume or may be a separate portable sensing device which may be manually inserted into different liquid containers or volumes.

The controller (230) includes a processing unit (240) and associated non-transient computer-readable medium or memory (242). In one example, the controller (230) is separate from the liquid level sensor (200). In other examples, the controller (230) is incorporated as part of the liquid level sensor (200). The processing unit (240) files instructions contained in memory (242). For purposes of this application, the term "processing unit" refers to a processing unit that executes sequences of instructions contained in memory. Execution of the sequences of instructions causes the processing unit to perform operations such as generating control signals. The instructions may be loaded in a random access memory (RAM) for execution by the processing unit from a read only memory (ROM), a mass storage device, or some other persistent storage. In other examples, hard wired circuitry may be used in place of or in combination with instructions to implement the functions described. For example, controller (230) may be embodied as part of at least one application-specific integrated circuits (ASICs). Unless otherwise specifically noted, the controller is not limited to any specific combination of hardware circuitry and software, nor to any particular source for the instructions executed by the processing unit.

The processing unit (240), following instructions contained in memory (242) carries out the method (100) shown and described above with respect to FIG. 2. The processor (240), following instructions provided in memory (242), selectively pulses the heaters (30). The processor (240), following instructions provided in memory (242), obtains data signals from the sensors (34), or in the data signals indicate dissipation of heat from the pulses and the transfer of heat to the sensors (34). The processor (240), following instructions provided in memory (242), determines a level of liquid (42) within the volume (40) based upon the signals from the sensors (34). As noted above, in some examples, the controller (230) may additionally determine an amount or volume of liquid using characteristics of the volume or chamber containing a liquid.

In one example, the display (232) receives signals from the controller (230) and presents visible data based upon the determined level of liquid (42) and/or determined volume or amount of liquid within the volume (40). In one example, the display (232) presents an icon or other graphic depicting a percentage of the volume (40) that is filled with the liquid (42). In another example, the display (232) presents an alphanumeric indication of the level of liquid (42) or percent of the volume (40) that is filled with the liquid (42) or that has been emptied of the liquid (42). In yet another example, the display (232) presents an alert or "acceptable" status based on the determined level liquid (42) within the volume (40). In yet other examples, the display (232) may be omitted, wherein the determined level of liquid (42) within the volume (40) is used to automatically trigger an event such as the reordering of replenishment liquid, the actuation of a valve to add a liquid (42) to the volume (40) or the actuation of valve to terminate the ongoing addition of liquid (42) to the volume 4.

FIG. 4 is a diagram of a liquid supply system (310) including the liquid level sensing system (220) of FIG. 3, according to one example of the principles described herein. The liquid supply system (310) includes a liquid container (312), a chamber (314) and fluid or liquid ports (316). The container 312 defines the chamber (314). The chamber (314) forms an example volume (40) in which liquid (42) is contained. As shown by FIG. 4, the carrier (222) and the liquid level sensing interface (24) project into the chamber (314) from a bottom side of the chamber (314), facilitating liquid level determinations as the chamber (314) nears a state of being completely empty. In other examples, the carrier (222) of the liquid level sensing interface (24) may alternatively be suspended from a top of the chamber (314).

Liquid ports (316) include liquid passes by which liquid (42) from within the chamber (314) is delivered or directed to an external recipient. In one example, the liquid ports (316) have a valve or other mechanism facilitating selective discharge of liquid (42) from the chamber (314). In one example, the liquid supply system (310) is an off-axis ink supply for a printing system. In another example, the liquid supply system (310) additionally has a print head (320) which is fluidically coupled to the chamber (314) and receives liquid (42) from the chamber (314) through the liquid level sensing interface (24). For purposes of this disclosure, the term "fluidically coupled" indicates that two or more fluid transmitting volumes are connected directly to one another or are connected to one another by intermediate volumes or spaces such that fluid may flow from one volume into the other volume.

In the example illustrated in FIG. 4, communication between the controller (230), which is remote or separate from the liquid supply system, is facilitated via a wiring connector (324) such as a universal serial bus connector or other type of connector. The controller (230) and the display (232) operate as described above.

FIG. 5 is a diagram of a liquid supply system (410) including the liquid level sensing system (220) of FIG. 3, according to one example of the principles described herein. The liquid supply system (410) is similar to the liquid supply system (310) except that the liquid supply system (410) has a liquid port (416) in place of the liquid port (316). The liquid port (416) is similar to liquid port (316) except that the liquid port (416) is provided in a cap (426) above the chamber (314) of the container (312). Those remaining components of the liquid supply system (410) which correspond to components of the system (310) are numbered similarly.

Figure 6:
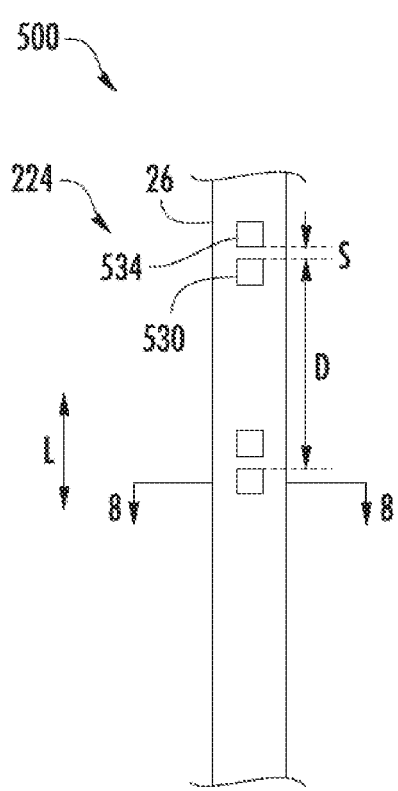
FIG. 6 is a diagram of a portion of a liquid level sensing interface of a liquid level sensor, according to one example of the principles described herein.
Figure 7:
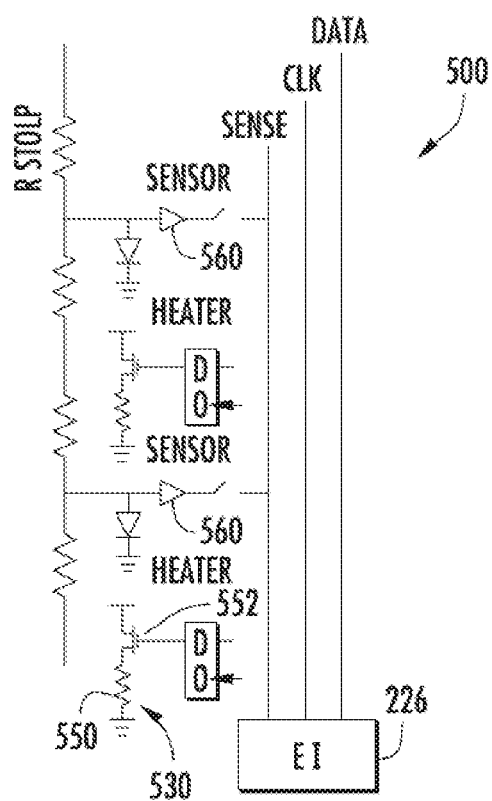
FIG. 7 is a circuit diagram of the liquid level sensor of FIG. 6, according to one example of the principles described herein.
Figure 8:
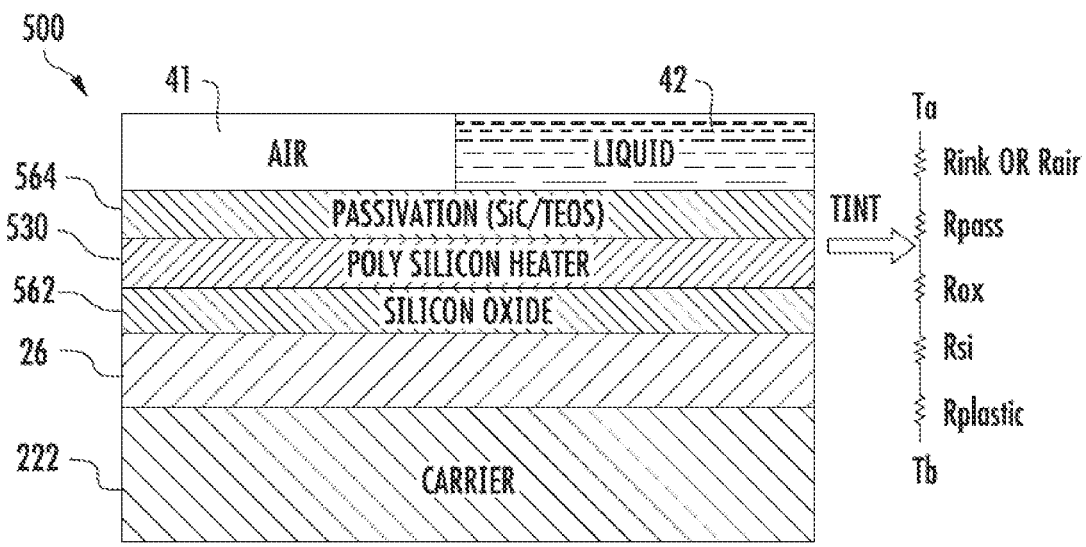
FIG. 8 is a sectional view of the liquid level sensing interface of FIG. 6, according to one example of the principles described herein.

FIGS. 6-8 illustrate a liquid level sensor (500), which is one example of the liquid level sensor (200), according to examples of the principles described herein. Specifically, FIG. 6 is a diagram of a portion of the liquid level sensing interface (224), FIG. 7 is a circuit diagram of the liquid level sensor (500), and FIG. 8 is a sectional view of the liquid level sensing interface (224) of FIG. 6, taken along line 8-8. As shown in FIG. 6, the liquid level sensing interface (224) is similar to the liquid level sensing interface (24) described above in that the liquid level sensing interface (224) has a strip (26) which supports a series of heaters (530) and a series of temperature sensors (534). In the example illustrated, the heaters (530) and the temperature sensors (534) are interdigitated or interleaved along the length L of the strip (26), wherein the length L is the major dimension of the strip (26) to extend across different depths when the liquid level sensor (500) is being used. In the example illustrated, each sensor (534) is spaced from its associated or corresponding heater (530) by a spacing distance S, as measured in a direction along the length L, of less than or equal to 20 μm and nominally 10 μm. In the example illustrated, the sensors (534) and their associated heaters (530) are arranged in pairs, wherein the heaters (530) of adjacent pairs are separated from one another by a distance D, as measured in a direction along the length L of at least 25 μm to reduce thermal cross talk between consecutive heaters. In one example, consecutive heaters (530) are separated from one another by a distance D of between 25 μm and 2500 μm, and nominally 100 μm.

As shown in FIG. 7, in the example illustrated, the heaters (530) may be an electrical resistor (550) which may be selectively turned on and off through the selective actuation of a transistor (552). Each sensor (534) may be a diode (560). In one example, a diode (560), serving as a temperature sensor, is a P-N junction diode. Each diode (560) has a characteristic response to changes in temperature. In particular, each diode (560) has a forward voltage that changes in response to changes in temperature. A diode (560) exhibits a nearly linear relationship between temperature and applied voltage. Because the temperature sensors (530) include diodes or semiconductor junctions, the sensor (500) has a lower cost and they can be fabricated upon the strip (26) using semiconductor fabrication techniques.

FIG. 8 is a sectional view of a portion of one example of a liquid level sensor (500). In the example illustrated, the strip (26) is supported by the carrier (222) (described above). In one example, the strip (26) is silicon while the carrier (222) comprises a polymer or plastic. In the example illustrated, a heater (530) is a polysilicon heater which is supported by the strip (26), but separated from the strip (26) by an electrically insulating layer (562), such as a layer of silicon dioxide. In the example illustrated, the heater (530) is further encapsulated by an outer passivation layer (564) which inhibits contact between the heater (530) and the liquid being sensed. The passivation layer (564) protects the heater (530) and sensors (534) from damage that would otherwise result from corrosive contact with the liquid or ink being sensed. In one example, the outer passivation layer (564) is silicon carbide and/or tetraethyl orthosilicate (TEOS). In other examples, the layers 562, 564 may be omitted or may be formed from other materials.

As shown in FIGS. 7 and 8, the construction of the liquid level sensor (500) creates various layers or barriers providing additional thermal resistances R. The pulse of heat emitted by a heater (530) is transmitted across such thermal resistances to the associated sensor (534). The rate at which the heat from a particular heater (530) is transmitted to the associated sensor (534) varies depending upon whether the particular heater (530) is bordered by air 41 or liquid (42). Signals from the sensor (534) will vary depending upon whether they were transmitted across air (41) or liquid (42). Differences in the signals are used to determine the current level of liquid within a volume.

FIGS. 9A, 9B and 9C are views of the liquid level sensing interfaces (624) and (644), which are other examples of the liquid level sensing interface (24). In FIG. 9A, heaters (30) and sensors (34) are arranged in pairs labeled 0, 1, 2, . . . N. The liquid level sensing interface (624) is similar to the liquid level sensing interface (24) except that rather than being interleaved or interdigitated vertically along the length of the strip (26), the heaters (30) and the sensors (34) are arranged in an array of side-by-side pairs vertically along the length of the strip (26).

FIGS. 9B and 9C are views of the liquid level sensing interface (644), another example of the liquid level sensing interface (24). The liquid level sensing interface 644 is similar to the liquid level sensing interface (24) except that the heaters (30) and sensors (34) are arranged in an array of stacks vertically spaced along the length of the strip (26). FIG. 9C is a sectional view of the liquid level sensing interface (644) taken along line 9C-9C further illustrating the stacked arrangement of the pairs of heaters (30) and sensors (34).

FIGS. 9A-9C additionally illustrate an example of pulsing of the heater (30) of heater/sensor pair 1 and the subsequent dissipation of heat through the adjacent materials. In FIGS. 9A-9O, the temperature or intensity of the heat dissipates or declines as the heat travels further away from the source of the heat, i.e., the heater (30) of heater/sensor pair 1. The dissipation of heat is illustrated by the change in cross-hatching in FIGS. 9A-9C.

FIG. 10 is a graph illustrating different sensed temperature responses over time to a heater impulse, according to one example of the principles described herein. FIG. 10 illustrates a pair of time synchronized graphs of the examples of pulsing shown in FIGS. 9A-9C. FIG. 10 illustrates the relationship between the pulsing of the heater (30) of heater sensor pair 1 and the response over time by sensors (34) of heater/sensor pairs 0, 1 and 2. As shown in FIG. 10, the response of each of the sensors (34) of each pairs 0, 1 and 2 varies depending upon whether air or liquid is over or adjacent to the respective heater/sensor pair 0, 1 and 2. The characteristic transient curve and magnitude scale differently in the presence of air versus the presence of liquid. As a result, signals from the liquid level sensing interface (644), as well as other interfaces such as the liquid level sensing interfaces (24) and (624), indicate the level of liquid (42) within the volume (40).

In one example, a controller, such as the controller (230) described above, determines a level of liquid within the sensed volume by individually pulsing the heater (30) of a pair and comparing the magnitude of the temperature, as sensed from the sensor (34) of the same pair, relative to the heater (30) pulsing parameters to determine whether liquid (42) or air (41) is adjacent to the individual heater/sensor pair. The controller (230) carries out such pulsing and sensing for each pair of the array until the level of the liquid (42) within the sensed volume (40) is found or identified. For example, the controller (230) may first pulse the heater (30) of pair 0 and compare the sensed temperature provided by the sensor (34) of pair 0 to a predetermined threshold. Thereafter, the controller (230) may pulse the heater (30) of pair 1 and compare the sensed temperature provided by the sensor (34) of pair 1 to a predetermined threshold. This process is repeated until the level of the liquid (42) is found or identified.

In another example, a controller, such as the controller (230) described above, determines a level of liquid (42) within the sensed volume (40) by individually pulsing the heater (30) of a pair and comparing multiple magnitudes of temperature as sensed by the sensors (34) of multiple pairs. For example, the controller (230) may pulse the heater (30) of pair 1 and thereafter compare the temperature sensed by the sensor (34) of pair 1, the temperature sensed by the sensor (34) of pair 0, the temperature sensed by the sensor (34) of pair 2, and so on, each temperature resulting from the pulsing of the heater (30) of pair 1. In one example, the controller may utilize the analysis of the multiple magnitudes of temperature from the different sensors (34) vertically along the liquid level sensing interface (24), resulting from a single pulse of heat, to determine whether liquid (42) or air (41) is adjacent to the heater sensor pair having the heater (30) that was pulsed. In such an example, the controller (230) carries out such pulsing and sensing by separately pulsing the heater (30) of each pair of the array and analyzing the resulting corresponding multiple different temperature magnitudes until the level of the liquid (42) within the sensed volume (40) is found or identified.

In another example, the controller may determine the level of liquid (42) within the sensed volume (40) based upon the differences in the multiple magnitudes of temperature vertically along the liquid level sensing interface (24) resulting from a single heat pulse. For example, if the magnitude of temperature of a particular sensor (34) drastically changes with respect to the magnitude of temperature of an adjacent sensor (34), the drastic change may indicate that the level of liquid (42) is at or between the two sensors (34). In one example, the controller may compare differences between the temperature magnitudes of adjacent sensors (34) to a predefined threshold to determine whether the level of liquid (42) is at or between the known vertical locations of the two sensors (34).

In yet other examples, a controller, such as the controller (230) described above, determines the level of liquid (42) within the sensed volume (40) based upon the profile of a transient temperature curve based upon signals from a single sensor (34) or multiple transient temperature curves based upon signals from multiple sensors (34). In one example, a controller, such as the controller (230) described above, determines a level of liquid (42) within the sensed volume (40) by individually pulsing the heater (30) of a pair and comparing the transient temperature curve, produced by the sensor (34) of the same pair, relative to the predefined threshold or a predefined curve to determine whether liquid (42) or air (41) is adjacent to the individual heater/sensor pair. The controller (230) carries out such pulsing and sensing for each pair of the array until the level of the liquid (42) within the sensed volume (40) is found or identified. For example, the controller (230) may first pulse the heater (30) of pair 0 and compare the resulting transient temperature curve produced by the sensor (34) of pair 0 to a predetermined threshold or predefined comparison curve. Thereafter, the controller (230) may pulse the heater (30) of pair 1 and compare the resulting transient temperature curve produced by the sensor (34) of pair 1 to a predetermined threshold or predefined comparison curve. This process is repeated until the level of the liquid (42) is found or identified.

In another example, a controller, such as the controller (230) described above, determines a level of liquid (42) within the sensed volume (40) by individually pulsing the heater (30) of a pair and comparing multiple transient temperature curves produced by the sensors of multiple pairs. For example, the controller (230) may pulse the heater (30) of pair 1 and thereafter compare the resulting transient temperature curve produced by the sensor (34) of pair 1, the resulting transient temperature curve produced by the sensor (34) of pair 0, the resulting transient temperature curve produced by the sensor (34) of pair 2, and so on, each transient temperature curve resulting from the pulsing of the heater (30) of pair 1. In one example, the controller may utilize the analysis of the multiple transient temperature curves from the different sensors (34) vertically along the liquid level sensing interface (24), resulting from a single pulse of heat, to determine whether liquid (42) or air (41) is adjacent to the heater sensor pair having the heater (30) that was pulsed. In such an example, the controller (230) carries out such pulsing and sensing by separately pulsing the heater (30) of each pair of the array and analyzing the resulting corresponding multiple different transient temperature curves until the level of the liquid (42) within the sensed volume (40) is found or identified.

In another example, the controller may determine the level of liquid (42) within the sensed volume (40) based upon the differences in the multiple transient temperature curves produced by different sensors (34) vertically along the liquid level sensing interface (24) resulting from a single heat pulse. For example, if the transient temperature curve of a particular sensor (34) drastically changes with respect to the transient temperature curve of an adjacent sensor (34), the drastic change may indicate that the level of liquid (42) is at or between the two sensors (34). In one example, the controller may compare differences between the transient temperature curves of adjacent sensors (34) to a predefined threshold to determine whether the level of liquid (42) is at or between the known vertical locations of the two sensors (34).

Figure 11:
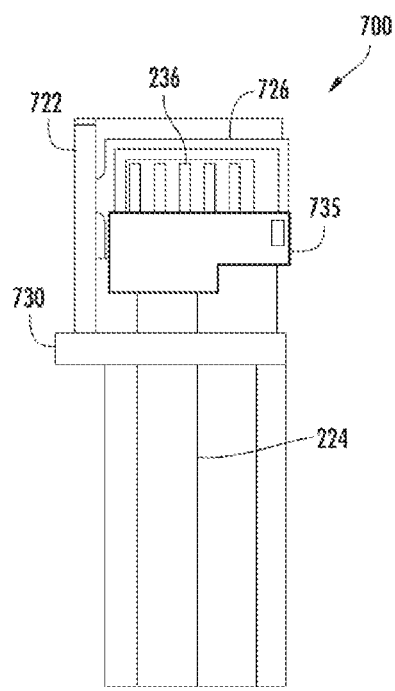
FIG. 11 is a diagram of a liquid level sensor, according to one example of the principles described herein.
Figure 12:
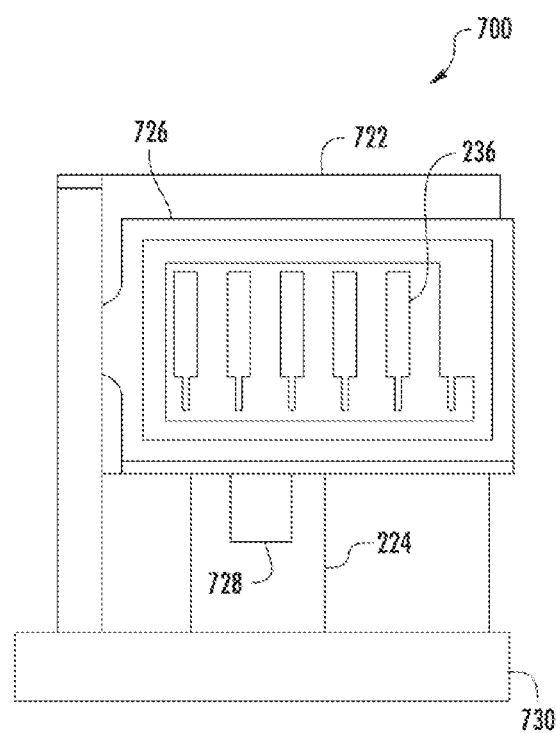
FIG. 12 is an enlarged view of a portion of the liquid level sensor of FIG. 11, according to one example of the principles described herein.

FIGS. 11 and 12 are diagrams of a liquid level sensor (700), which is an example of the liquid level sensor (500), according to one example of the principles described herein. The liquid level sensor (700) includes a carrier (722), a liquid level sensing interface (224), an electrical interface (726), a driver (728) and collar (730). The carrier (722) is similar to the carrier (222) described above. In the example illustrated, the carrier (722) is a molded polymer. In other examples, the carrier (722) may comprise a glass or other materials.

The liquid level sensing interface (224) is described above. The liquid level sensing interface (224) is bonded, glued or otherwise adhered to a face of the carrier (722) along the length of the carrier (722). The carrier (722) may be formed from, or comprise, glass, polymers, FR4 or other materials.

The electrical interconnect (726) includes a printed circuit board having electrical contact pads (236) for making an electrical connection with the controller (230) (described above with respect to FIGS. 3-5). In the example illustrated, the electrical interconnect (726) is bonded or otherwise adhered to the carrier (722). The electrical interconnect (726) is electrically connected to the driver (728) as well as the heaters (530) and sensors (534) of the liquid level sensing interface (224). The driver (728) may be an application-specific integrated circuit (ASIC) which drives the heaters (530) and the sensors (534) in response to signals received through the electrical interconnect (726). In other examples, the driving of the heaters (530) and the sensing by the sensors (534) may alternatively be controlled by a fully integrated driver circuit in lieu of an ASIC.

The collar (730) extends about the carrier (722). The collar (730) serves as a supply integration interface between the carrier (722) and the liquid container in which the sensor (700) is used to detect a level of a liquid (42) within a volume (40). In some examples, the collar (730) provides a liquid seal, separating liquid (42) contained within the volume (40) that is being sensed and the electrical interconnect (726). As shown in FIG. 11, in some examples, the driver (728) as well as the electrical connections between the driver (728), the liquid level sensing interface (224) and the electrical interconnect (726) are further covered by a protective electrically insulating wire bond adhesive or encapsulant (735) such as a layer of epoxy mold compound.

Figure 13:
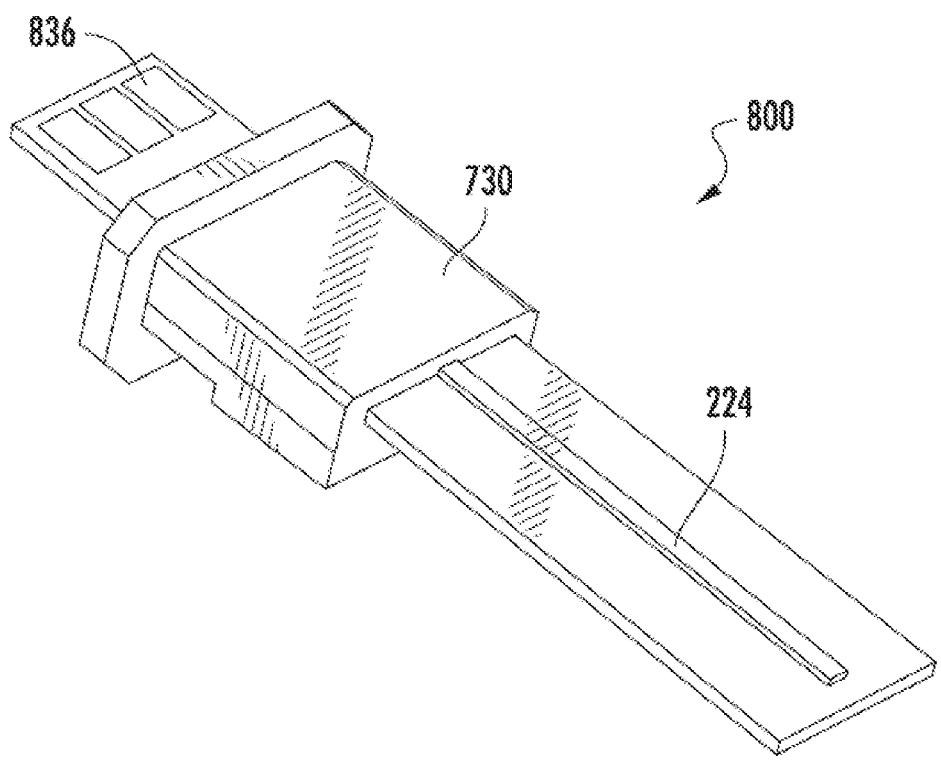
FIG. 13 is a perspective view of a liquid level sensor, according to one example of the principles described herein.

FIGS. 13-15 are views of a liquid level sensor (800), another example of the liquid level sensor (500), according to one example of the principles described herein. The liquid level sensor (800) is similar to the liquid level sensor (700) except that liquid level sensor (800) includes the carrier (822) in place of the carrier (722) and omits the electrical interconnect (726). The carrier (822) is a printed circuit board or other structure having embedded electrical traces and contact pads to facilitate electrical connection between various electronic components mounted upon the carrier (822). In one example, the carrier (822) is a composite material of woven fiberglass cloth with an epoxy resin binder. In one example, the carrier (822) is a glass-reinforced epoxy laminate sheet, tube, rod or printed circuit board, such as an FR4 printed circuit board.

As shown in FIGS. 14 and 15, the liquid level sensing interface (224) is easily bonded to the carrier (822) by a die attach adhesive (831). The liquid level sensing interface (224) is further wire bonded to the acumen or driver (728) and the electrical contact pads (836) are provided as part of the carrier (822). The encapsulant 735 overlays or covers the wire bonds between the liquid level sensing interface (224), the driver (728) and the electrical contact pads (836). As shown in FIG. 13, the collar (730) is positioned about the encapsulant (735) between a lower end of the liquid level sensing interface (224) and the electrical contact pads (836).

Figure 18A:
FIGS. 18A-18E are side views illustrating the formation of a liquid level sensor as it is being formed, according to one example of the principles described herein.
Figure 18B:
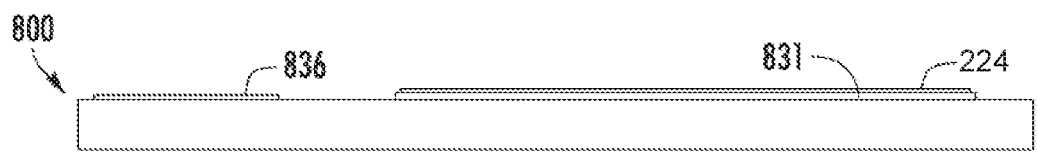

FIGS. 16, 17 and 18A-18E illustrate the formation of the liquid level sensor (800), according to one example of the principles described herein. Specifically, FIG. 16 illustrates a method (900) for forming the liquid level sensor (800). As indicated by block 902, the liquid level sensing interface (224) is attached to the carrier (822). As indicated by block 904, the driver (728) is also attached to the carrier (822), FIG. 18A illustrates the carrier (822) prior to the attachment of the liquid level sensing interface (224) and the driver (728). FIG. 18B illustrates the liquid level sensor (800) after the attachment of the liquid level sensing interface (224) and driver (728) (shown in FIG. 14) with the adhesive layer (831). In one example, the adhesive layer (831) is stamped upon the carrier (822) to precisely locate the adhesive (831). In one example, the attachment of the liquid level sensing interface (224) and the driver (728) further includes curing of the adhesive.

Figure 18C:
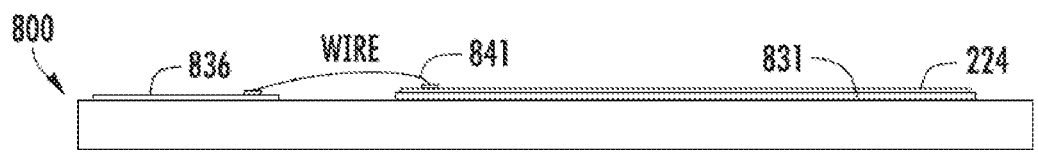
Figure 18D:
Figure 18E:
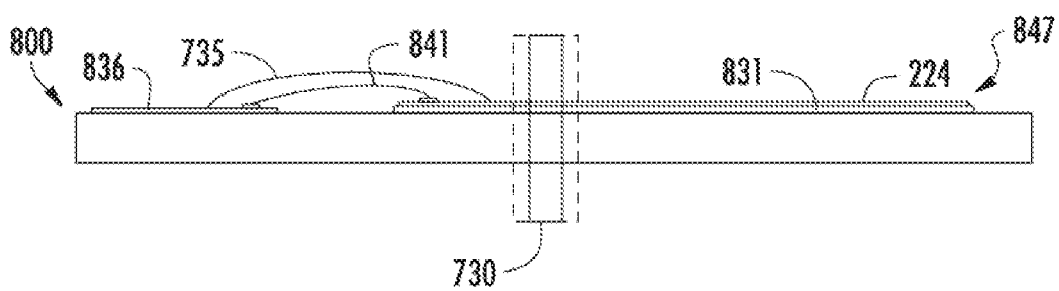

As indicated by block 906 of FIG. 16, the liquid level sensing interface (224) is wire bonded to the electrical contact pads (836) of the carrier (822) serving as an electrical interconnect. As indicated by block 908 in FIG. 16, the wire bonds (841) shown in FIG. 18C are then encapsulated with an encapsulant (735). In one example, the encapsulant (735) is cured. As shown in FIG. 17, in one example, multiple liquid level sensors (800) may be formed as part of a single panel (841). For example, a single FR4 panel having electrically conductive traces and contact pads for multiple liquid level sensors (800) may be used as a substrate upon which the liquid level sensing interfaces (224), drivers (728), and encapsulant (735) may be formed. As indicated by block 910 of FIG. 16, in such an example, the individual liquid level sensors (800) are singulated from the panel. As illustrated by FIG. 18E, in applications where the liquid level sensor (800) is to be incorporated as part of a liquid or fluid supply, the collar (730) is further secured to the carrier (822) between the wire bonds 841 and the lower end (847) of the liquid level sensing interface (224). In one example, collar (730) is adhesively bonded to the carrier (822) by an adhesive that is subsequently cured.

Figure 19:
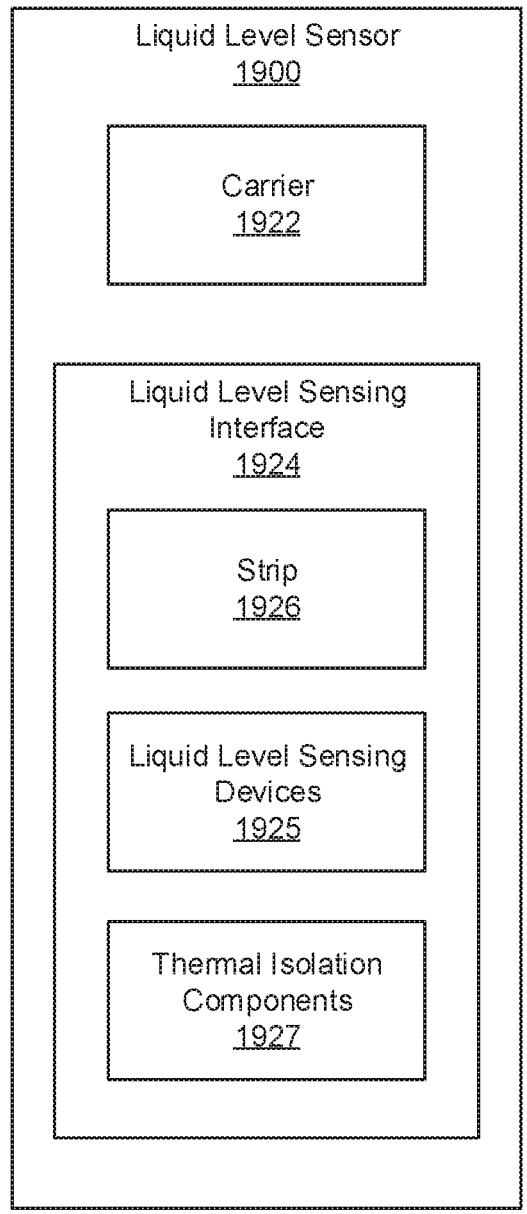
FIG. 19 is a block diagram of a liquid level sensor, according to one example of the principles described herein.

FIG. 19 is a block diagram of a liquid level sensor (1900), according to one example of the principles described herein. As described above, the liquid level sensor (1900) includes a carrier (1922). The carrier (1922) may be similar to the carriers described above. That is, the carrier (1922) may be a rigid component, such as a printed circuit board, that provides electrical connectivity between a liquid level sensing interface (1924) and an electrical interconnect. In the present specification, the liquid level sensing interface (1924) comprises a strip (1926) which may be similar to the strips described above and has the liquid level sensing devices (1925) disposed thereon. In a specific example, the carrier (1922) is a printed circuit board that has a double clad single core with plated through holes. Such through holes are used to bring the electrical contact pads to the same side of the carrier (1922) as the liquid level sensing interface (1924).

In some examples, the electrical interconnect includes a number of electrical contact pads that may be similar to previously described electrical contact pads. The electrical interconnect, i.e., the electrical contact pads, collect data from a number of liquid level sensing devices (1925) that are disposed on the elongated strip (1926) and that form a part of the liquid level sensing interface (1924).

In some examples, the liquid level sensing interface (1924) is a sliver die that has a high aspect ratio. As described above, the aspect ratio describes a width and length relationship of the liquid level sensing interface (1924). In this example, the liquid level sensing interface (1924), and specifically the elongated strip (1926) may have an aspect ratio of at least 1:50. In other words, the length of the liquid level sensing interface (1924) may be 50 times longer than a width of the liquid level sensing interface (1924). In a further example, the aspect ratio of width to length may be at least 1:80. In yet another example, the aspect ratio of width to length may be at least 1:100. In other words, the width of the liquid level sensing interface (1924) may be two orders of magnitude smaller than the length of the liquid level sensing interface (1924). As a specific numeric example, the liquid level sensing interface (1924) may be less than 220 micrometers wide and longer than 22 millimeters. In some examples, the liquid level sensing interface (1924) is a sliver die that is narrow, for example, less than 220 micrometers wide.

Using such a narrow liquid level sensing interface (1924) allows for enhanced silicon die separation ratios to reduce sensor cost. Moreover, the sliver liquid level sensing interface (1924) offers precise control over the liquid level sensing interface (1924) geometry and enhances the liquid level sensing as more accurate placement of liquid level sensing devices (1925) is possible.

As described above, the liquid level sensing interface (1924) includes a number of liquid level sensing devices (1925). The liquid level sensing devices (1925) may extend along a length of the elongated strip (1926). Different types of liquid level sensing devices (1925) use different sensing methods to detect the level of liquid in the liquid container. For example, impedance liquid level sensing devices (1925) detect the capacitance of a device that is influenced by the liquid. As liquid conducts electricity at a different rate then air, the conductivity between liquid level sensing devices (1925) can be used to determine whether the conducting medium is air or liquid.

In another example, the liquid level sensing devices (1925) are thermal sensing devices. Examples of thermal liquid level sensing devices are the heaters and sensors described above. The liquid level sensing interface (1924) may be a high resolution liquid level sensing interface (1924) meaning it has a high density of liquid level sensing devices (1925). For example, the liquid level sensing interface (1924) may include over 80 sensors per inch of length of the elongated strip (1926).

The liquid level sensor (1900) also includes a number of thermal isolation components (1927). These thermal isolation components (1927) are disposed on the elongated strip (1926) and make up part of the liquid level sensing interface (1924). The thermal isolation components thermally isolate adjacent liquid level sensing devices (1925). For example, as described above in connection with FIGS. 9A-9C, in some cases, heat emanating from one heater can reach multiple sensors, even those that are not paired with the emanating heater. The thermal isolation components (1927) reduce the magnitude of heat emanating from a heater will pass to non-paired sensors. FIGS. 20A, 20B, 21A-21C, and 22A-220 provide examples of thermal isolation components (1927) of a liquid level sensor (1900).

Figure 20A:
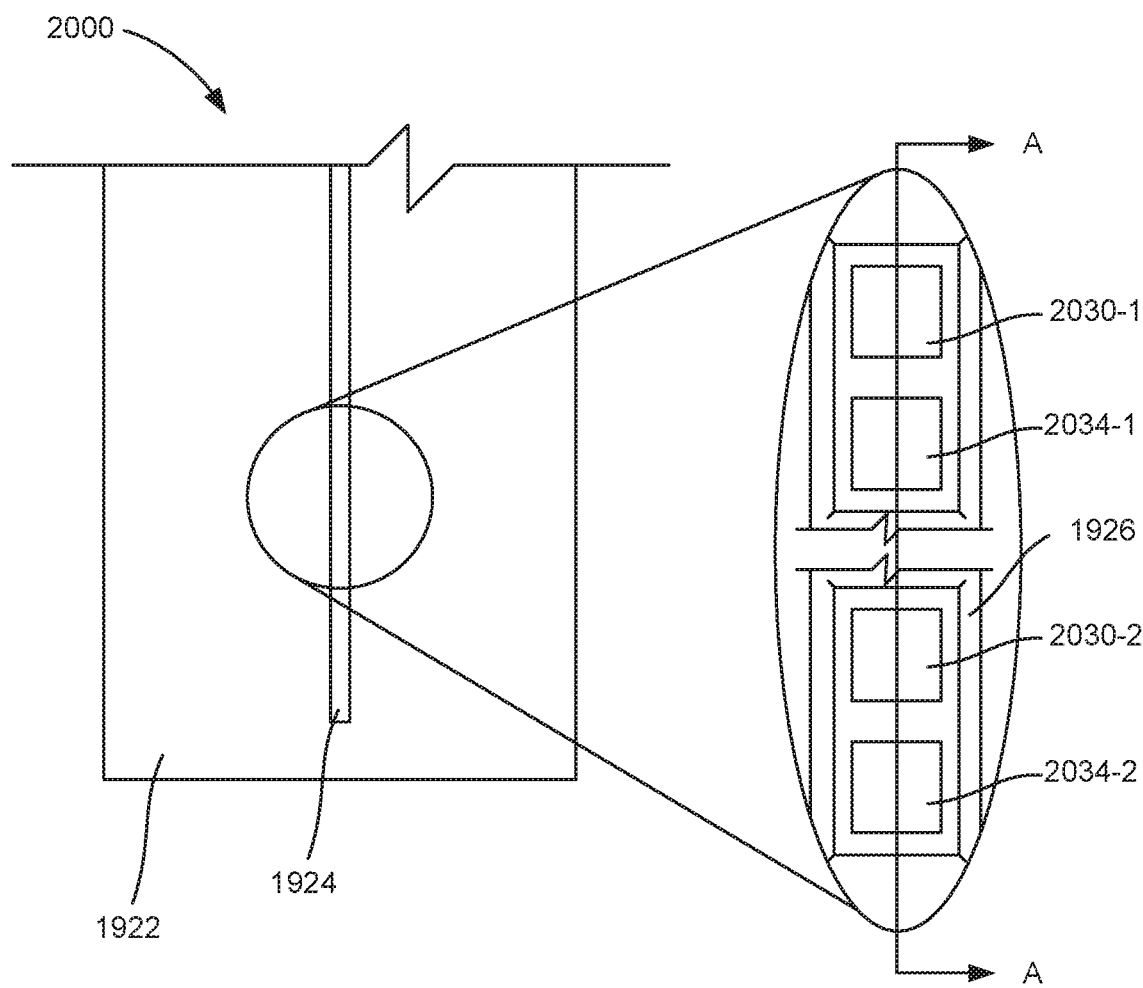
FIGS. 20A and 20B are views of a liquid level sensor, according to one example of the principles described herein.
Figure 20B:
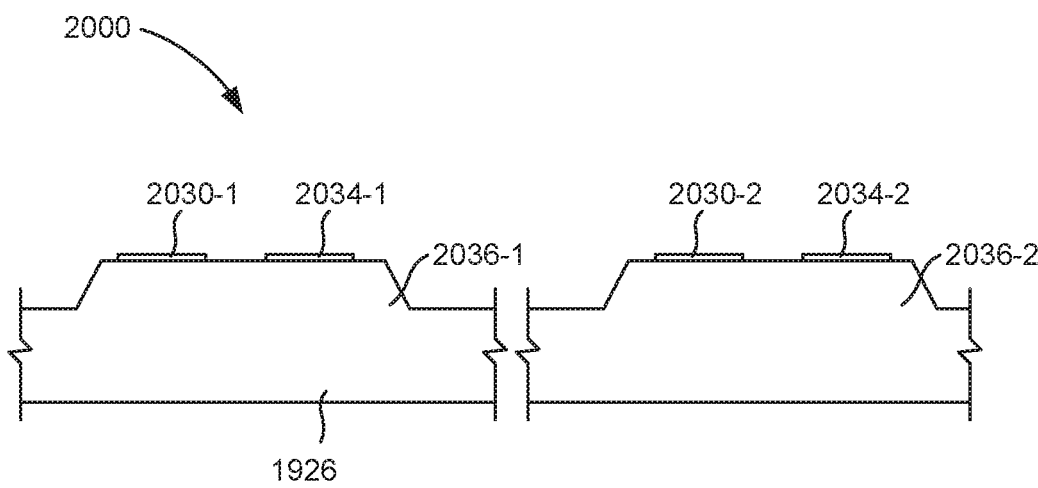

FIGS. 20A and 20B are views of a liquid level sensor (2000), according to one example of the principles described herein. Specifically, FIG. 20A is a top view of the liquid level sensor (2000) with a zoomed in portion showing individual liquid level sensing devices (FIG. 19, 1925) disposed thereon and FIG. 20B is a cross-sectional view of the liquid level sensor (2000) taken along the line A-A from FIG. 20A.

In some regards, the liquid level sensor (2000) may be similar to the liquid level sensor (FIG. 19, 1900) described earlier in that it includes a carrier (1922) and a liquid level sensing interface (1924) disposed thereon. The liquid level sensor (2000) includes a number of liquid level sensing devices (FIG. 19, 1925) disposed on the strip (1926) of the liquid level sensing interface (1924). Specifically it includes a number of heaters (2030) and sensors (2034). For simplicity, in FIGS. 20A and 20B (as well as later figures), a few heaters (2030-1, 2030-2) and sensors (2034-1, 2034-2) are depicted, but the heaters (2030) and sensors (2034) may extend along a length of the strip (1926). Note that the liquid level sensing devices (FIG. 19, 1925), i.e., the heaters (2030) and sensors (2034) as depicted in at least FIG. 20 are not to scale and are enlarged to show their presence on the liquid level sensing interface (1924).

As depicted in FIGS. 20A and 20B, the heaters (2030) and sensors (2034) are paired together to determine whether liquid or air is disposed on top of the sensors (2034) and using such information a controller can determine a liquid level in the container. To make such a determination, heat is generated by a heater (2030) as described above, which heat emanates towards a corresponding sensor (2034). Based on the temperature of heat measured at the sensor (2034) and the amount of time it takes for the heat to propagate to the sensor (2034), a controller can determine whether at that particular sensor, air or liquid is present.

However, the heat generated by the heater (2030) may dissipate through the bulk of the silicon strip (1926) on which the heater (2030) is disposed. The amount of heat transferred through the silicon strip (1926) may be a non-negligible amount. Moreover, adjacent sensors (2034) may detect this transferred heat which may affect its own detection of heat, and corresponding liquid level detection.

Accordingly, thermal isolation components (FIG. 19, 1927) are disposed on the elongated strip (1926) of the liquid level sensing interface (1924) in an attempt to reduce the amount of heat conduction from one heater (2030) towards a non-paired sensor (2034). Accordingly, in one example, the thermal isolation component (FIG. 19, 1927) includes a platform (2036) that raises a corresponding pair of liquid level sensing devices (FIG. 19, 1925), i.e., a heater (2030)/sensor (2034) pair, away from a surface of the strip (1926). Each corresponding heater (2030)/sensor (2034) pair may be disposed on corresponding platforms (2036). For example, a first liquid level sensing device (FIG. 19, 1925) of a first heater (2030-1) and a first sensor (2034-1) are disposed on a first platform (2036-1) while a second liquid level sensing device (FIG. 19, 1925) of a second heater (2030-2) and a second sensor (2034-2) are disposed on a second platform (2036-2). In so doing, the effective cross-sectional area of the heat drain for the heaters (2030) is reduced such that there is less transfer of heat to the bulk strip (1926) and accordingly, less transfer of heat to adjacent liquid level sensing devices (FIG. 19, 1925).

The platforms (2036) may be formed of the same material as the strip (1926). Specifically, both the platform (2036) and the strip (1926) may be formed of silicon.

As noted above, the platform (2036) as a thermal isolation component (FIG. 19, 1927) reduces the thermal bleed from one heater, i.e., a first heater (2030-1) towards a non-paired sensor, i.e., the second sensor (2034-2). Details regarding the manufacture of such a platform (2036) are described below in connection with FIG. 25.

Figure 21A:
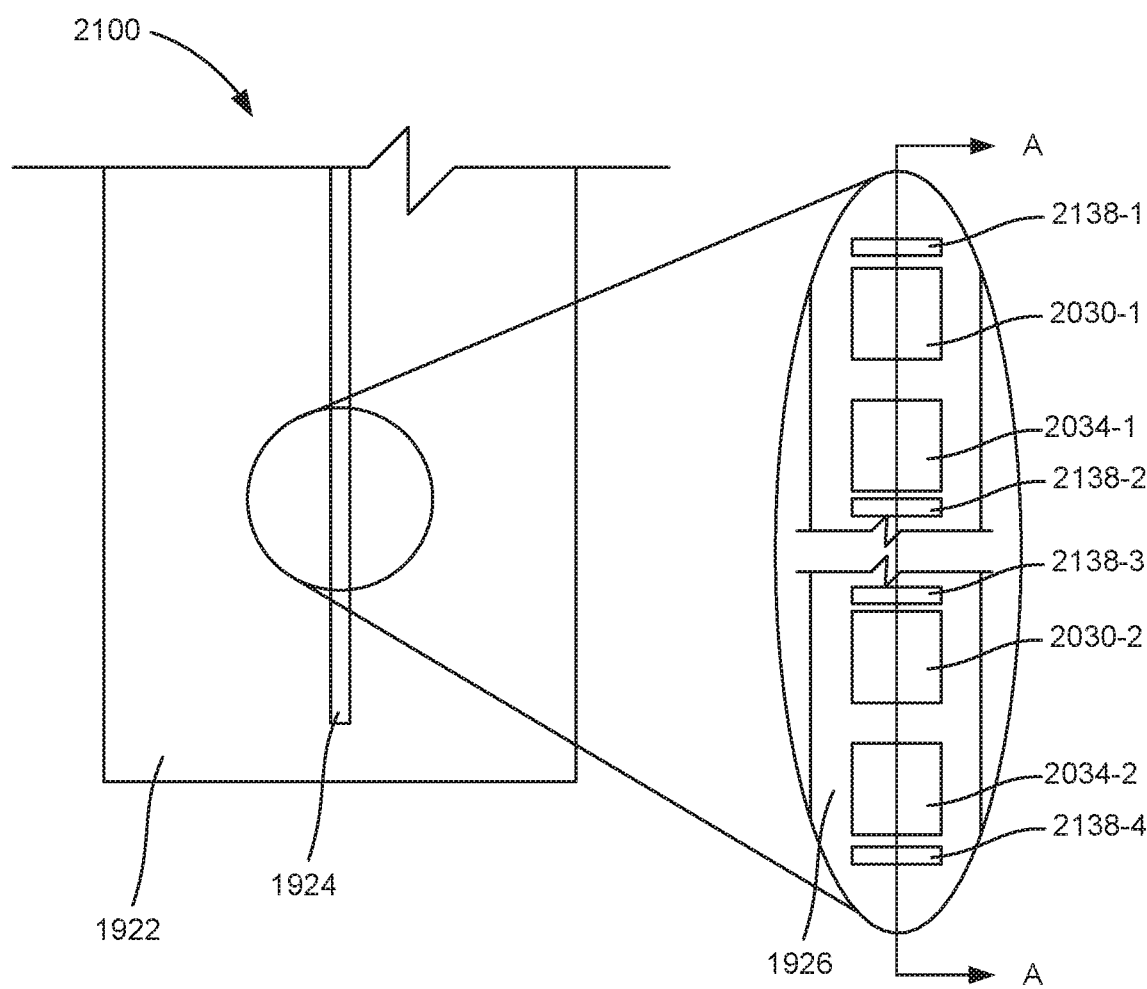
FIGS. 21A-21C are views of a liquid level sensor, according to another example of the principles described herein.
Figure 21B:
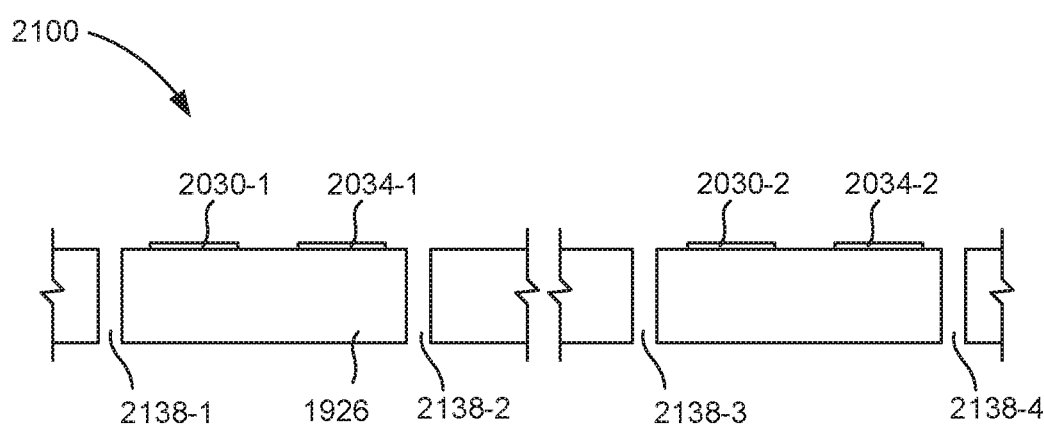
Figure 21C:
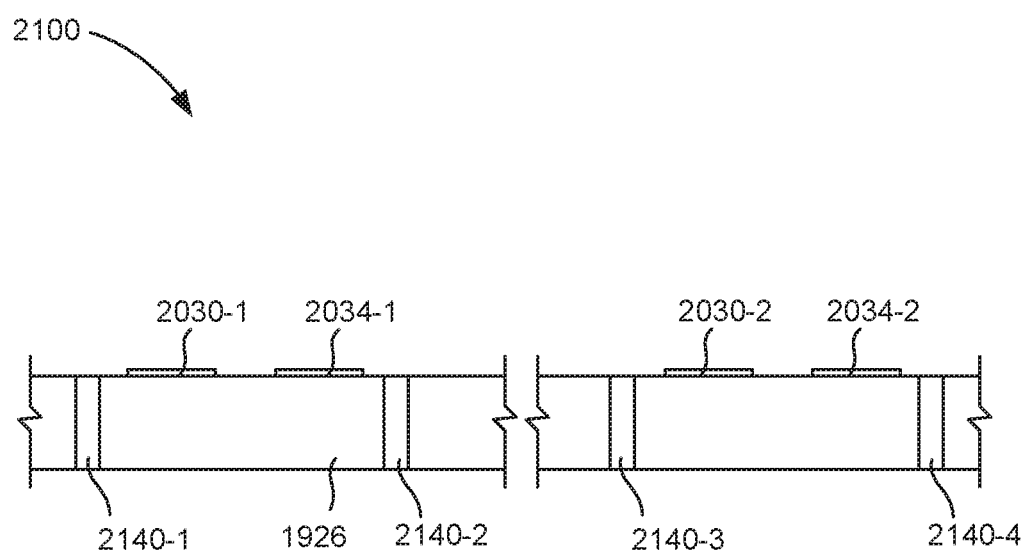

FIGS. 21A-21C are views of a liquid level sensor (2100), according to another example of the principles described herein. Specifically, FIG. 21A is a top view of the liquid level sensor (2100) with a zoomed in portion showing individual liquid level sensing devices (FIG. 19, 1925) and FIGS. 21B and 21C are cross-sectional views of the liquid level sensor (2100) taken along the line A-A from FIG. 21A.

In some regards, the liquid level sensor (2100) may be similar to the liquid level sensor (1900) described earlier in that it includes a carrier (1922) and a liquid level sensing interface (1924) disposed thereon. The liquid level sensor (2100) includes a number of liquid level sensing devices (FIG. 19, 1925) disposed on the strip (1926) of the liquid level sensing interface (1924). Specifically it includes a number of heaters (2030) and sensors (2034). For simplicity, in FIGS. 21A-21C, a few heaters (2030-1, 2030-2) and sensors (2034-1, 2034-2) are depicted, but the heaters (2030) and heat sensors (2034) may extend along a length of the strip (1926). Note that the liquid level sensing devices (FIG. 19, 1925), i.e., the heaters (2030) and sensors (2034), as depicted in at least FIG. 21 are not to scale and are enlarged to show their presence on the liquid level sensing interface (1924).

In one example, the thermal isolation components (FIG. 19, 1927) include a number of slots (2138) through the strip (1926) between adjacent pairs of liquid level sensing devices (FIG. 19, 1925), i.e., heaters (2030) and sensors (2034). For example, a first slot (2138-1) may be placed on one side of a first heater (2030-1)/sensor (2034-1) pair, and a second slot (2138-2) may be placed on a second side of the first heater (2030-1)/sensor (2034-1) pair. Similarly, a third slot (2138-1) may be placed on one side of a second heater (2030-2)/sensor (2034-2) pair and a fourth slot (2138-4) may be placed on a second side of the second heater (2030-2)/sensor (2034-2) pair.

Similar to the platforms (FIG. 20, 2036) described above, the slots (2138) reduce the effective thermal drain area, thus reducing the thermal conductivity to adjacent heater/sensor pairs.

In some examples, the slots (2138) may be filled with a material. For example, as depicted in FIG. 220, a filler (2140-1, 2140-2, 2140-3, 2140-4) may be a polymeric material such as SU-8 or photo-resist that is disposed within the slots (2138). This insulating filler (2140) further increases the thermal isolation of adjacent liquid level sensing device pairs and thus reduces the magnitude of thermal heat bleeding from one pair to an adjacent pair. While specific reference is made to an SU-8 filler and a photo-resist filler, any type of filler (2140) may be used as long as it has a thermal conductivity that is less than the silicon that forms the strip (1926). Details regarding the manufacture of the slots (2138) are described below in connection with FIG. 25.

Figure 22A:
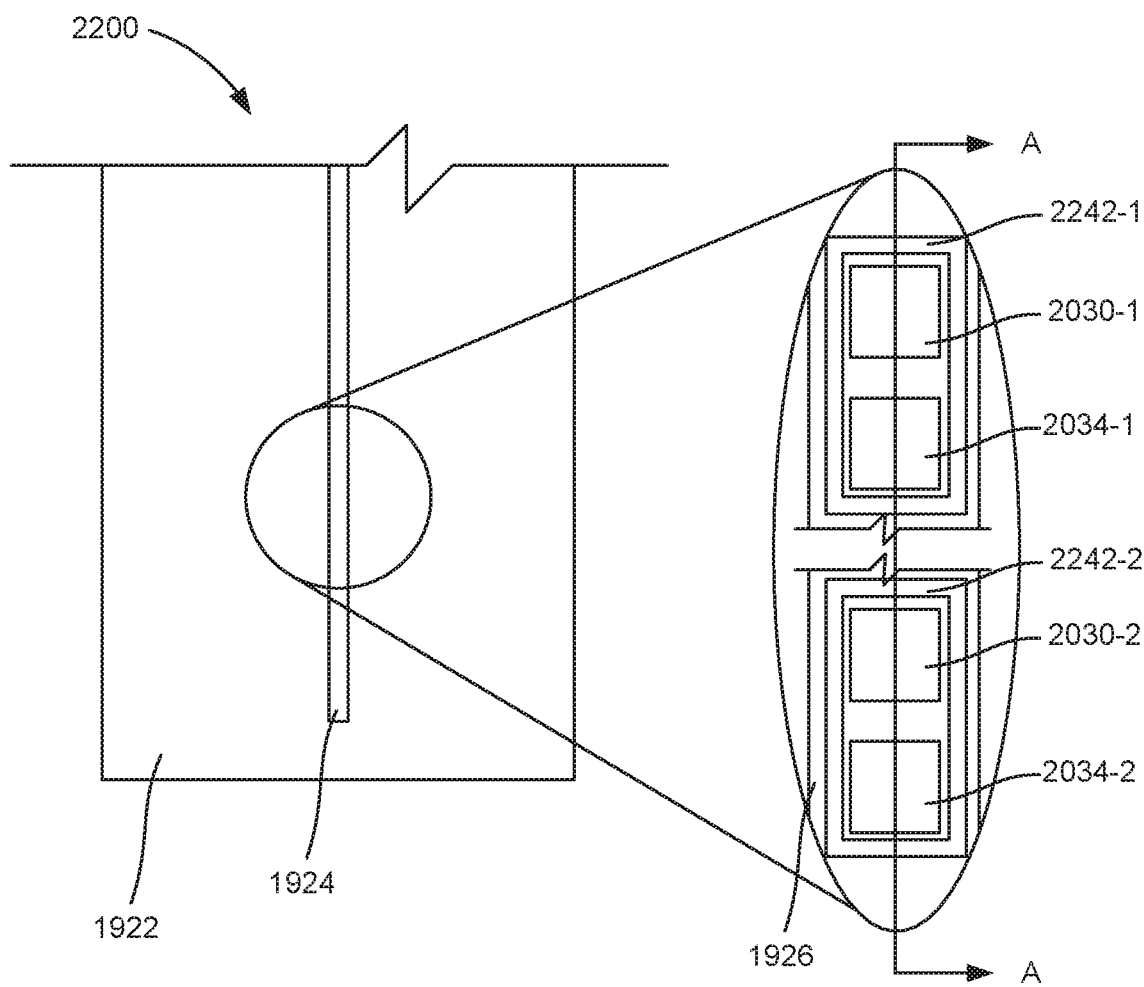
FIGS. 22A-22O are views of a liquid level sensor, according to another example of the principles described herein.
Figure 22B:
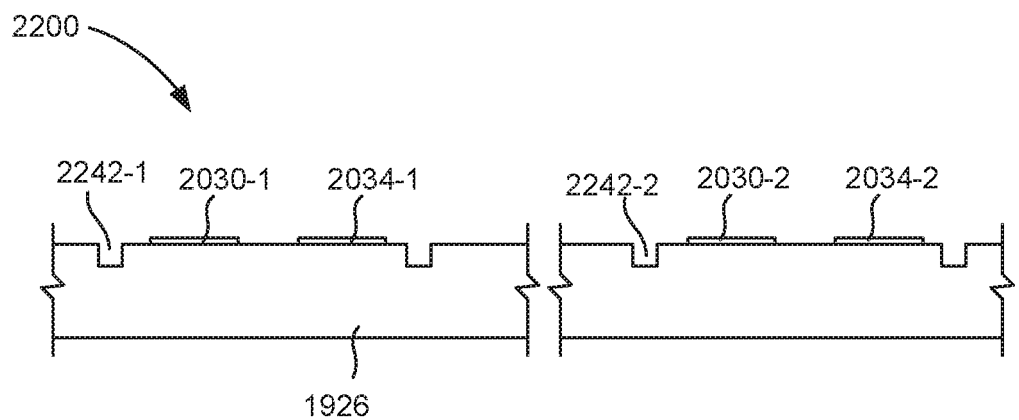
Figure 22C:
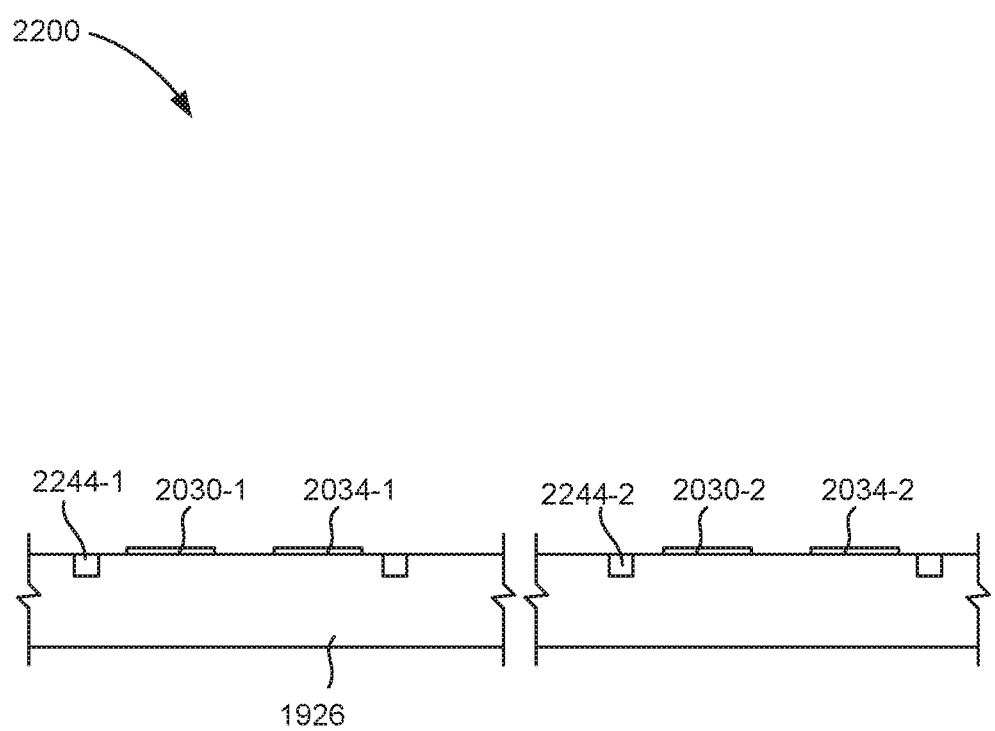

FIGS. 22A-22O are views of a liquid level sensor (2200), according to another example of the principles described herein. Specifically, FIG. 22A is a top view of the liquid level sensor (2200) with a zoomed in portion showing individual liquid level sensing devices (FIG. 19, 1925) and FIGS. 22B and 22C are cross-sectional views of the liquid level sensor (2200) taken along the line A-A from FIG. 22A.

In some regards, the liquid level sensor (2200) may be similar to the liquid level sensor (1900) described earlier in that it includes a carrier (1922) and a liquid level sensing interface (1924) disposed thereon. The liquid level sensor (2200) includes a number of liquid level sensing devices (FIG. 19, 1925) disposed on the strip (1926) of the liquid level sensing interface (1924). Specifically, the liquid level sensor (2200) includes a number of heaters (2030) and sensors (2034). For simplicity, in FIGS. 22A-22O, a few heaters (2030-1, 2030-2) and sensors (2034-1, 2034-2) are depicted, but the heaters (2030) and sensors (2034) may extend along a length of the strip (1926). Note that the liquid level sensing devices (FIG. 19, 1925), i.e., the heaters (2030) and sensors (2034) as depicted in at least FIG. 22 are not to scale and are enlarged to show their presence on the liquid level sensing interface (1924).

In one example, the thermal isolation components (FIG. 19, 1927) includes a number of grooves (2242) disposed on a surface of the strip (1926) around corresponding pairs of liquid level sensing devices (FIG. 19, 1925), i.e., heaters (2030) and sensors (2034). For example, a first groove (2242-1) may be etched around a first heater (2030-1)/sensor (2034-1) pair, and a second groove (2242-2) may be etched around a second heater (2030-2)/sensor (2034-2) pair.

In some examples, the grooves (2242) may be filled with a material. For example, as depicted in FIG. 22C, a filler (2244-1, 2244-2) may be a polymeric material such as SU-8 or photoresist that is disposed within the grooves (2242). While specific reference is made to an SU-8 filler or a photo-resist filler, any type of filler (2144) may be used as long as it has a thermal conductivity that is less than the silicon that forms the strip (1926). This insulating filler (2244) further increases the thermal isolation of adjacent liquid level sensing device (FIG. 19, 1925) pairs and thus reduces the magnitude of thermal heat bleeding from one pair to an adjacent pair. Details regarding the manufacture of the grooves (2242) are described below in connection with FIG. 25.

Figure 23A:
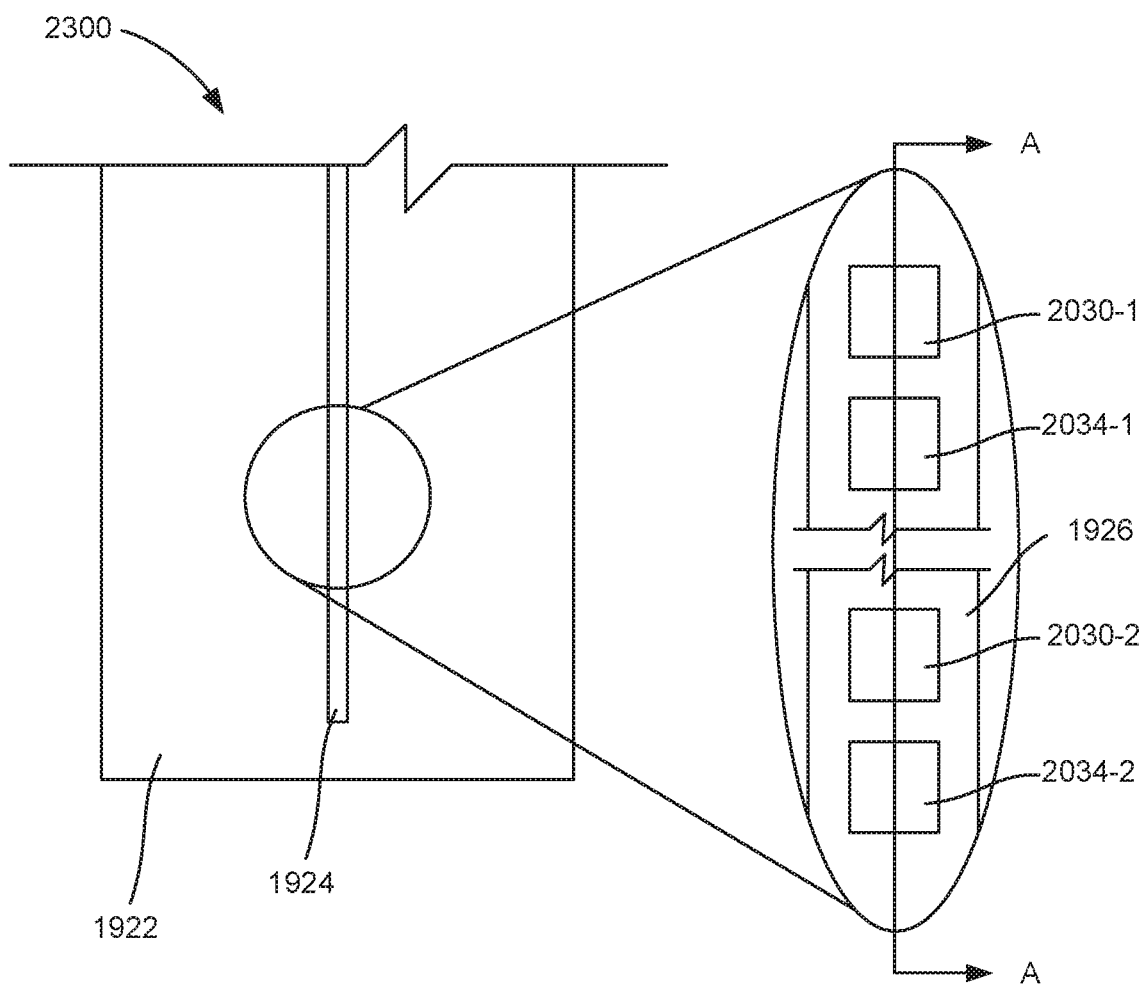
FIGS. 23A and 23B are views of a liquid level sensor, according to another example of the principles described herein.
Figure 23B:
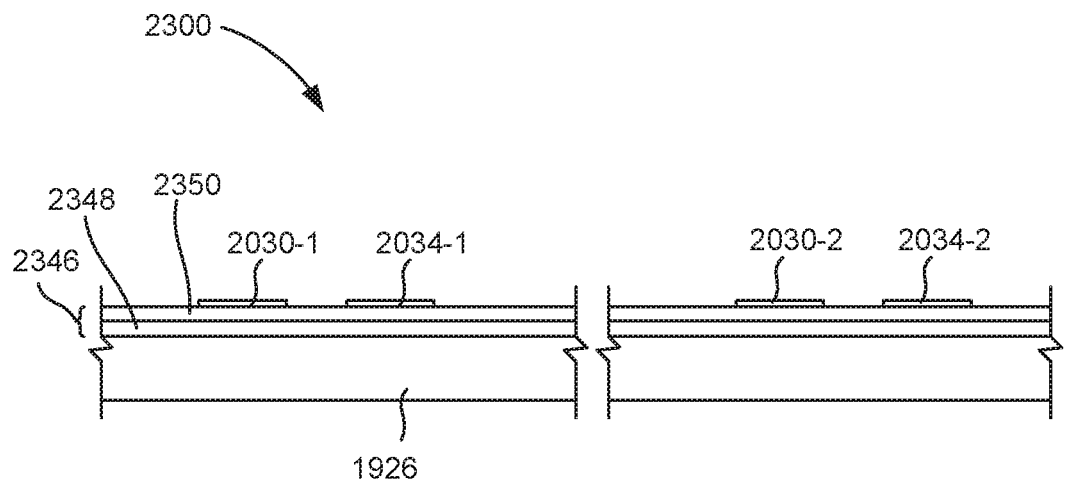

FIGS. 23A and 23B are views of a liquid level sensor (2300), according to another example of the principles described herein. Specifically, FIG. 23A is a top view of the liquid level sensor (2300) with a zoomed in portion showing individual liquid level sensing devices (FIG. 19, 1925) and FIG. 23B is a cross-sectional view of the liquid level sensor (2300) taken along the line A-A from FIG. 23A.

In some regards, the liquid level sensor (2300) may be similar to the liquid level sensor (1900) described earlier in that it includes a carrier (1922) and a liquid level sensing interface (1924) disposed thereon. The liquid level sensor (2300) includes a number of liquid level sensing devices (FIG. 19, 1925) disposed on the strip (1926) of the liquid level sensing interface (1924). Specifically, the liquid level sensor (2300) includes a number of heaters (2030) and sensors (2034). For simplicity, in FIGS. 23A and 23B, a few heaters (2030-1, 2030-2) and sensors (2034-1, 2034-2) are depicted, but the heaters (2030) and sensors (2034) may extend along a length of the strip (1926). Note that the liquid level sensing devices (FIG. 19, 1925), i.e., the heaters (2030) and sensors (2034) as depicted in at least FIG. 23 are not to scale and are enlarged to show their presence on the liquid level sensing interface (1924).

In one example, the thermal isolation components (FIG. 19, 1927) includes a substrate-on-insulator section (2346) disposed between the strip (1926) and the number of liquid level sensing devices (FIG. 19, 1925), i.e., heaters (2030) and sensors (2034). As with the other thermal isolation components (FIG. 19, 1927), a substrate-on-insulator section (2346) reduces the thermal drain of the heater (2030)/sensor (2034) pair. The substrate-on-insulator (2346) section includes an insulator layer (2348). The insulator layer (2348) may be formed of any insulating material that has a lower thermal conductivity than the silicon strip (1926). For example, the insulator layer (2348) may be formed of the SU-8 or photo-resist described above. While specific reference is made to an SU-8 filler or a photo-resist, any type of insulator may be used as long as it has a thermal conductivity that is less than the silicon that forms the strip (1926).

The substrate-on-insulator section (2346) also includes a substrate layer (2350) that provides a physical connection between the strip (1926) of the liquid level sensing device (1924) and the liquid level sensing devices (FIG. 19, 1925). In some examples, the substrate is a silicon, such that the substrate-on-insulator (2346) section is a silicon-on-insulator section. Details regarding the manufacture of the substrate-on-insulator section (2346) are described below in connection with FIG. 25.

While FIGS. 20-23 describe particular thermal isolation components, (FIG. 19, 1927), any of the various thermal isolation components (FIG. 19, 1927) may be combined. For example, a platform (FIG. 20, 2036) could be used in conjunction with the slots (FIG. 21, 2138) and/or the substrate-on-insulator (2346) section.

Figure 24:
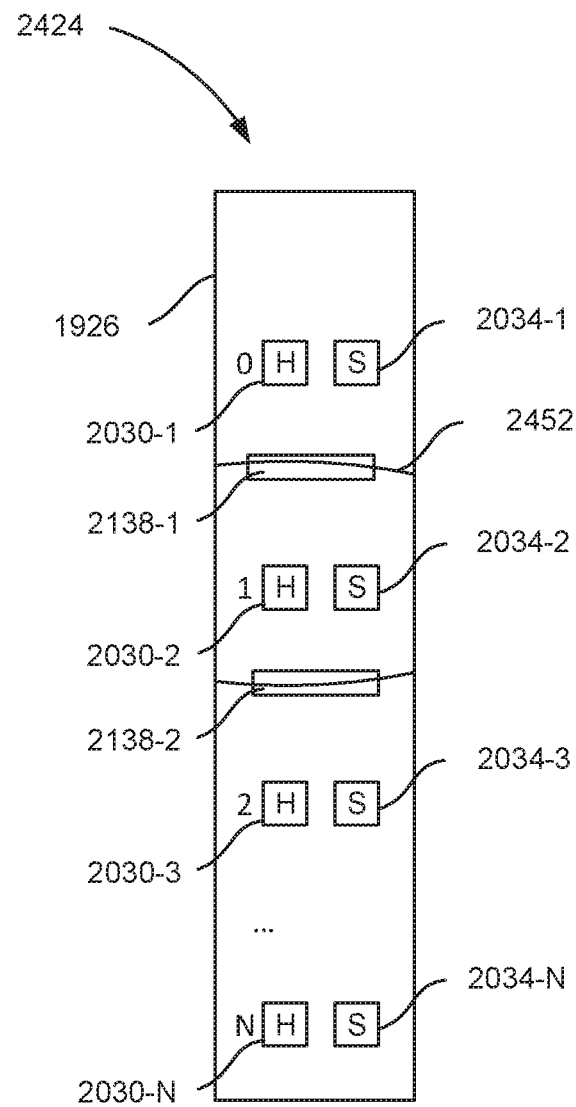
FIG. 24 is a fragmentary front views of the liquid level sensor of FIG. 19, illustrating an example heat spike resulting from the pulsing of a heater, according to one example of the principles described herein.

FIG. 24 is a fragmentary front view of the liquid level sensor of FIG. 19, illustrating an example heat spike resulting from the pulsing of a heater (2030), according to one example of the principles described herein. In FIG. 24, heaters (2030) and sensors (2034) are arranged in pairs labeled 0, 1, 2 . . . N. The liquid level sensing interface (2424) is similar to the liquid level sensing interface (24) except that rather than being interleaved or interdigitated vertically along the length of the strip (26), the heaters (30) and the sensors (34) are arranged in an array of side-by-side pairs vertically along the length of the strip (1926).

FIG. 24 additionally illustrates an example of pulsing of the heater (2030) of heater/sensor pair 1 and the subsequent dissipation of heat through the adjacent materials. The dissipation of heat throughout the strip (1926) is indicated by the curved lines (2452). As compared to the example depicted in FIGS. 9A-9C, the slots (2038) can be seen to limit the dissipation of heat to adjacent sensor pairs. While FIG. 24 illustrates such an effect with slots (2138), similar effects will prevail if grooves (2242) or platforms (2036) as described herein are implemented.

Figure 25:
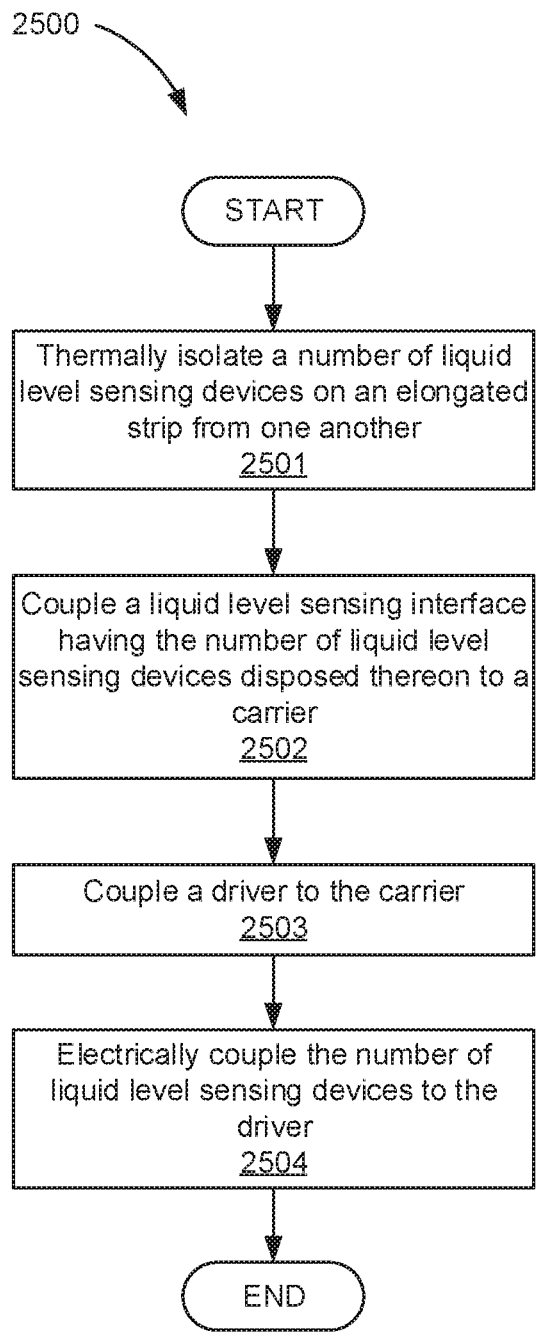
FIG. 25 is a flowchart of a method for forming a liquid level sensor, according to one example of the principles described herein.

FIG. 25 is a flowchart of a method (2500) for forming a liquid level sensor (FIG. 19, 1900), according to one example of the principles described herein. As described above the liquid level sensor (FIG. 19, 1900) includes a liquid level sensing interface (FIG. 19, 1924) that includes a number of liquid level sensing devices (FIG. 19, 1925) formed on an elongated strip (FIG. 19, 1926). According to the method (2500), the number of liquid level sensing devices (FIG. 19, 1925) are thermally isolated (block 2501)

from one another. In general, thermally isolating (block 2501) the number of liquid level sensing devices (FIG. 19, 1925) from one another can be accomplished by forming a thermal drain that has a cross-sectional area that is less than that of the liquid level sensing interface. Many of the methods described herein, including forming a platform, slot or grooves, forms such a reduced cross-sectional thermal drain.

As different thermal isolation components (FIG. 19, 1927) may be used, thermally isolating (block 2501) the liquid level sensing devices (FIG. 19, 1925) from one another may take many forms. For example, thermally isolating (block 2501) the number of liquid level sensing devices (FIG. 19, 1925) could include forming a slot (FIG. 21A, 2138) through the strip (FIG. 19, 1926) of the liquid level sensing interface (FIG. 19, 1924) between adjacent liquid level sensing devices (FIG. 19, 1925). In a similar example, thermally isolating (block 2501) the number of liquid level sensing devices (FIG. 19, 1925) could include forming a groove (FIG. 22A, 2242) in the strip (FIG. 19, 1926) around corresponding heater (FIG. 20, 2030)/sensor (FIG. 20, 2034) pairs that make up a liquid level sensing device (FIG. 19, 1925). The slots (FIG. 21A, 2138) and grooves (FIG. 22a, 2242) may be formed by any number of methods including shallow trench isolation. In shallow trench isolation a trench is formed in the strip (FIG. 19, 1926) in the desired pattern.

In some cases, as indicated in FIGS. 21C and 22C, the slot (FIG. 21A, 2138) or groove (FIG. 22A, 2042) can be filled with a dielectric material such as silicon dioxide to even further increase the thermal isolation of adjacent liquid level sensing devices (FIG. 19, 1925). A wafer-thinning process could then be carried out to remove excess silicon dioxide off the surface of the strip (FIG. 19, 1926). While specific mention is made of silicon oxide as a filler material, any number of materials may be used that have a thermal conductivity that is less than the thermal conductive of the silicon that makes up the strip (FIG. 19, 1926).

In another example, the slots (FIG. 21A, 2138) and/or grooves (FIG. 22A, 2242) could be dry etched, wherein a masking material is layered down and the strip (FIG. 19, 1926) is bombarded by ions to dislodge portions of the exposed surface of the strip (FIG. 19, 1926). Similarly, as described above, the slot (FIG. 21A, 2138) or groove (FIG. 22A, 2042) can be filled with a dielectric material such as silicon dioxide to even further increase the thermal isolation of adjacent liquid level sensing devices (FIG. 19, 1925).

In another example, thermally isolating (block 2501) the number of liquid level sensing devices (FIG. 19, 1925) may include forming a platform (FIG. 20, 2036) by removing material of the elongated strip (FIG. 19, 1926) to form the platforms (FIG. 20, 2036) on which the liquid level sensing devices (FIG. 19, 1925) sit. Those processes described above to form the slots (FIG. 21, 2138) and grooves (FIG. 22, 2242) may be used to form the raised platforms (FIG. 20, 2036).

In yet another example, thermally isolating (block 2501) the number of liquid level sensing devices (FIG. 19, 1925) may include depositing a substrate-on-insulator section (FIG. 23, 2346) on top of the strip (FIG. 19, 1926). Doing so may include individually depositing the insulator layer (FIG. 23, 2348) on the strip (FIG. 19, 1926) and then subsequently depositing the substrate layer (FIG. 23, 2350) on the insulator layer (FIG. 23, 2348), which substrate may be silicon. In other examples, the insulator layer (FIG. 23, 2348) and the substrate layer (FIG. 23, 2350) may be joined previously in some operation, and then after being joined, deposited on the strip (FIG. 19, 1926).

Such thermal isolation reduces thermal cross talk that may occur as heat emanated from a heater (FIG. 20, 2030) in a liquid level sensing device (FIG. 19, 1925) travels through the bulk of the liquid level sensing strip (FIG. 19, 1926) and is detected by an adjacent sensor (FIG. 20, 2034) that is not paired with the heater (FIG. 20, 2030).

The liquid level sensing interface (FIG. 19, 1924) having the number of thermally isolated liquid level sensing devices (FIG. 19, 1925) can then be coupled (block 2502) to a carrier (FIG. 19, 1922). The liquid level sensing interface (FIG. 19, 1924) may be coupled (block 2502) to the carrier (FIG. 19, 1922) in any number of fashions. For example, an adhesive may be stamped onto the carrier (FIG. 19, 1922) and the liquid level sensing interface (FIG. 19, 1924) can then be placed on the adhesive. When the adhesive cures, the liquid level sensing interface (FIG. 19; 1924) is affixed to the carrier (FIG. 19, 1922). While specific reference is made to a stamp adhesive, other methods may be used as well.

According to the method (2500), a driver is also coupled (block 2503) to the carrier (FIG. 19, 1922). As described above the driver can control the operation of the liquid level sensing devices (FIG. 19, 1925), and can also relay information from the liquid level sensing devices (FIG. 19; 1925) to the electrical contact pads (FIG. 3, 236). Similar to the liquid level sensing interface (FIG. 19, 1924), the driver (728) is coupled (block 2503) to the carrier (FIG. 19, 1922) in any number of fashions, including using an adhesive stamp. In these examples; after the components are attached, the adhesive is cured so as to permanently affix the liquid level sensing interface (FIG. 19, 1924) and the driver (728) to the carrier (FIG. 19, 1922).

According to the method (2500); the liquid level sensing devices (FIG. 19; 1925) and electrical contact pads (FIG. 3, 236) are electrically coupled (block 2504) together via the liquid level sensing interface (FIG. 19, 1924) and the driver (728) such that signals can be interchanged between these components. For example; the liquid level sensing interface (FIG. 19, 1924) can wire-bonded to the electrical interconnects (FIG. 3, 236).

Using such a sensor for sensing a liquid level 1) provides a low cost; high volume; and simple manufacturing process; 2) isolates adjacent liquid level sensing devices to reduce thermal cross-talk between adjacent pairs and thereby increasing liquid level sensing sensitivity; 3) provides a high resolution and high performance liquid level sensing platform; 4) supports multiple processes for detecting liquid levels; and 5) results in increased customer satisfaction due to the increased performance. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:
1. A liquid level sensor comprising:
a carrier;
a liquid level sensing interface disposed on the carrier, the liquid level sensing interface comprising:
a number of liquid level sensing devices disposed on an elongated strip, the number of liquid level sensing devices to detect a liquid level in a liquid container; and a number of thermal isolation components formed on the elongated strip to thermally isolate adjacent liquid level sensing devices.

2. The liquid level sensor of claim 1, wherein the liquid is ink.

3. The liquid level sensor of claim 1, wherein a liquid level sensing device comprises a heater and a sensor.

4. The liquid level sensor of claim 3, wherein the heaters and sensors are interdigitated along the elongated strip.

5. The liquid level sensor of claim 1, wherein a thermal isolation component is a platform to raise a corresponding liquid level sensing device away from a surface of the elongated strip.

6. The liquid level sensor of claim 5, wherein adjacent liquid level sensing devices are disposed on different platforms.

7. The liquid level sensor of claim 1, wherein the thermal isolation component are slots through the elongated strip between adjacent liquid level sensing devices.

8. The liquid level sensor of claim 7, wherein the slots are filled with an insulating material.

9. The liquid level sensor of claim 1, wherein the thermal isolation component is a groove disposed in a surface of the elongated strip around a corresponding liquid level sensing device.

10. The liquid level sensor of claim 9, wherein the groove is filled with an insulating material.

11. The liquid level sensor of claim 1, wherein the thermal isolation component is a substrate-on-insulator section disposed between the elongated strip and the number of liquid level sensing devices.

12. The liquid level sensor of claim 1, wherein:
the thermal isolation component is a thermally-insulating layer disposed between the number of liquid level sensing devices and the substrate; and
the thermally insulating layer has a thermal conductively less than the thermal conductivity of the substrate.

13. The liquid level sensor of claim 1, wherein the liquid level sensing interface is a sliver die with a length of the liquid level sensing interface being at least 50 times longer than a width of the liquid level sensing interface.

14. A method for forming a liquid level sensor, comprising:
thermally isolating a number of liquid level sensing devices disposed on an elongated strip of a liquid level sensing interface from one another;
coupling the liquid level sensing interface to a carrier;
coupling a driver to the carrier, the driver to output data collected from the number of liquid level sensing devices; and
electrically coupling the number of liquid level sensing devices to the driver via the liquid level sensing interface.

15. The method of claim 14, wherein thermally isolating the number of liquid level sensing devices comprises forming a thermal drain having a cross-sectional area less than the elongated strip.

16. The method of claim 14, wherein thermally isolating the number of liquid level sensing devices comprises forming a slot through the elongated strip between adjacent liquid level sensing devices.

17. The method of claim 14, wherein thermally isolating the number of liquid level sensing devices comprises forming a groove in the elongated strip around a perimeter of a corresponding liquid level sensing device.

18. The method of claim 17, further comprising filling at least one of a slot and a groove in the elongated strip with a material having a lower thermal conductivity than the material of the carrier.

19. A printable liquid container comprising:
a chamber to hold a volume of the printable liquid;
a liquid level sensor disposed within the chamber, wherein the liquid level sensor comprises:
a carrier;
a liquid level sensing interface disposed on the carrier, the liquid level sensing interface comprising:
a number of liquid level sensing devices disposed on an elongated strip, the number of liquid level sensing devices comprising independent heaters and sensors to detect a liquid level in a liquid container; and
a number of thermal isolation components disposed on the elongated strip to thermally isolate adjacent liquid level sensing devices and reduce a magnitude of heat emanating from a heater to a non-paired sensor.

20. The container of claim 19, wherein the number of liquid level sensing devices are selected from the group consisting of thermal liquid level sensing devices, and impedance liquid level sensing devices.

* * * * *